United States Patent
Etzkorn et al.

(10) Patent No.: US 8,960,898 B1
(45) Date of Patent: Feb. 24, 2015

(54) CONTACT LENS THAT RESTRICTS INCOMING LIGHT TO THE EYE

(71) Applicants: James Etzkorn, Mountain View, CA (US); Brian Otis, Sunnyvale, CA (US)

(72) Inventors: James Etzkorn, Mountain View, CA (US); Brian Otis, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 81 days.

(21) Appl. No.: 13/625,841

(22) Filed: Sep. 24, 2012

(51) Int. Cl.
*G02C 7/04* (2006.01)
(52) U.S. Cl.
CPC ..................................... *G02C 7/049* (2013.01)
USPC .................................................... 351/159.03
(58) Field of Classification Search
CPC .......... G02C 7/04; G02C 7/049; G02C 7/102; G02C 7/104; G02C 7/105; G02C 7/107; G02C 7/165
USPC .......................... 351/159.02–159.38; 345/7–9
See application file for complete search history.

(56) References Cited

U.S. PATENT DOCUMENTS

| | | | |
|---|---|---|---|
| 3,958,560 A | 5/1976 | March | |
| 4,014,321 A | 3/1977 | March | |
| 4,055,378 A | 10/1977 | Feneberg et al. | |
| 4,122,942 A | 10/1978 | Wolfson | |
| 4,136,250 A | 1/1979 | Mueller et al. | |
| 4,143,949 A | 3/1979 | Chen | |
| 4,153,641 A | 5/1979 | Deichert et al. | |
| 4,214,014 A | 7/1980 | Hofer et al. | |
| 4,309,085 A | 1/1982 | Morrison | |
| 4,312,575 A | 1/1982 | Peyman et al. | |
| 4,401,371 A | 8/1983 | Neefe | |
| 4,463,149 A | 7/1984 | Ellis | |
| 4,555,372 A | 11/1985 | Kunzler et al. | |
| 4,604,479 A | 8/1986 | Ellis | |
| 4,632,844 A | 12/1986 | Yanagihara et al. | |
| 4,686,267 A | 8/1987 | Ellis et al. | |
| 4,740,533 A | 4/1988 | Su et al. | |
| 4,826,936 A | 5/1989 | Ellis | |
| 4,996,275 A | 2/1991 | Ellis et al. | |
| 4,997,770 A | 3/1991 | Giles et al. | |
| 5,032,658 A | 7/1991 | Baron et al. | |

(Continued)

FOREIGN PATENT DOCUMENTS

| | | |
|---|---|---|
| EP | 0369942 | 5/1990 |
| EP | 686372 | 12/1995 |

(Continued)

OTHER PUBLICATIONS

Wall, K., "Active contact lens that lets you see like the Terminator patented," Feb. 10, 2012, http://www.patexia.com/feed/active-contact-lens-that-lets-you-see-like-the-terminator-patented-2407, Last accessed Mar. 28, 2012, 5 pages.

(Continued)

*Primary Examiner* — Darryl J Collins
*Assistant Examiner* — Gary O'Neill
(74) *Attorney, Agent, or Firm* — McDonnell Boehnen Hulbert & Berghoff LLP

(57) ABSTRACT

This disclosure generally relates to systems and/or methods to restrict light entering an opening of an eye pupil by detecting pupil dilation, detecting incoming light intensity or direction, and adjusting light restricting properties of one or more light restricting regions of the contact lens based upon the detected pupil dilation parameters and incoming light intensity or direction.

26 Claims, 21 Drawing Sheets

(56) References Cited

U.S. PATENT DOCUMENTS

| | | |
|---|---|---|
| 5,034,461 A | 7/1991 | Lai et al. |
| 5,070,215 A | 12/1991 | Bambury et al. |
| 5,135,297 A | 8/1992 | Valint |
| 5,177,165 A | 1/1993 | Valint et al. |
| 5,177,168 A | 1/1993 | Baron |
| 5,219,965 A | 6/1993 | Valint et al. |
| 5,260,000 A | 11/1993 | Nandu et al. |
| 5,271,875 A | 12/1993 | Appleton et al. |
| 5,310,779 A | 5/1994 | Lai |
| 5,321,108 A | 6/1994 | Kunzler et al. |
| 5,326,584 A | 7/1994 | Kamel et al. |
| 5,336,797 A | 8/1994 | McGee et al. |
| 5,346,976 A | 9/1994 | Ellis et al. |
| 5,358,995 A | 10/1994 | Lai et al. |
| 5,364,918 A | 11/1994 | Valint et al. |
| 5,387,662 A | 2/1995 | Kunzler et al. |
| 5,449,729 A | 9/1995 | Lai |
| 5,472,436 A | 12/1995 | Fremstad |
| 5,512,205 A | 4/1996 | Lai |
| 5,585,871 A | 12/1996 | Linden |
| 5,610,252 A | 3/1997 | Bambury et al. |
| 5,616,757 A | 4/1997 | Bambury et al. |
| 5,682,210 A | 10/1997 | Weirich |
| 5,708,094 A | 1/1998 | Lai et al. |
| 5,710,302 A | 1/1998 | Kunzler et al. |
| 5,714,557 A | 2/1998 | Kunzler et al. |
| 5,726,733 A | 3/1998 | Lai et al. |
| 5,760,100 A | 6/1998 | Nicolson et al. |
| 5,908,906 A | 6/1999 | Kunzler et al. |
| 5,981,669 A | 11/1999 | Valint et al. |
| 6,087,941 A | 7/2000 | Ferraz |
| 6,131,580 A | 10/2000 | Ratner et al. |
| 6,193,369 B1 | 2/2001 | Valint et al. |
| 6,200,626 B1 | 3/2001 | Grobe et al. |
| 6,213,604 B1 | 4/2001 | Valint et al. |
| 6,312,393 B1 | 11/2001 | Abreu |
| 6,348,507 B1 | 2/2002 | Heiler et al. |
| 6,366,794 B1 | 4/2002 | Moussy et al. |
| 6,423,001 B1 | 7/2002 | Abreu |
| 6,428,839 B1 | 8/2002 | Kunzler et al. |
| 6,431,705 B1 | 8/2002 | Linden |
| 6,440,571 B1 | 8/2002 | Valint et al. |
| 6,450,642 B1 | 9/2002 | Jethmalani et al. |
| 6,532,298 B1 | 3/2003 | Cambier et al. |
| 6,550,915 B1 | 4/2003 | Grobe |
| 6,570,386 B2 | 5/2003 | Goldstein |
| 6,579,235 B1 | 6/2003 | Abita et al. |
| 6,599,559 B1 | 7/2003 | McGee et al. |
| 6,614,408 B1 | 9/2003 | Mann |
| 6,630,243 B2 | 10/2003 | Valint et al. |
| 6,638,563 B2 | 10/2003 | McGee et al. |
| 6,726,322 B2 | 4/2004 | Andino et al. |
| 6,735,328 B1 | 5/2004 | Helbing et al. |
| 6,779,888 B2 | 8/2004 | Marmo |
| 6,804,560 B2 | 10/2004 | Nisch et al. |
| 6,851,805 B2 | 2/2005 | Blum et al. |
| 6,885,818 B2 | 4/2005 | Goldstein |
| 6,939,299 B1 | 9/2005 | Petersen et al. |
| 6,980,842 B2 | 12/2005 | March et al. |
| 7,018,040 B2 | 3/2006 | Blum et al. |
| 7,131,945 B2 | 11/2006 | Fink et al. |
| 7,169,106 B2 | 1/2007 | Fleischman et al. |
| 7,398,119 B2 | 7/2008 | Lambert et al. |
| 7,423,801 B2 | 9/2008 | Kaufman et al. |
| 7,429,465 B2 | 9/2008 | Muller et al. |
| 7,441,892 B2 | 10/2008 | Hsu |
| 7,443,016 B2 | 10/2008 | Tsai et al. |
| 7,450,981 B2 | 11/2008 | Jeon |
| 7,639,845 B2 | 12/2009 | Utsunomiya |
| 7,654,671 B2 | 2/2010 | Glynn |
| 7,699,465 B2 | 4/2010 | Dootjes et al. |
| 7,728,949 B2 | 6/2010 | Clarke et al. |
| 7,751,896 B2 | 7/2010 | Graf et al. |
| 7,799,243 B2 | 9/2010 | Mather et al. |
| 7,809,417 B2 | 10/2010 | Abreu |
| 7,878,650 B2 | 2/2011 | Fritsch et al. |
| 7,885,698 B2 | 2/2011 | Feldman |
| 7,907,931 B2 | 3/2011 | Hartigan et al. |
| 7,926,940 B2 | 4/2011 | Blum et al. |
| 7,931,832 B2 | 4/2011 | Pugh et al. |
| 7,964,390 B2 | 6/2011 | Rozakis et al. |
| 8,080,187 B2 | 12/2011 | Tepedino, Jr. et al. |
| 8,096,654 B2 | 1/2012 | Amirparviz et al. |
| 8,118,752 B2 | 2/2012 | Hetling et al. |
| 8,142,016 B2 | 3/2012 | Legerton et al. |
| 8,224,415 B2 | 7/2012 | Budiman |
| 2002/0193674 A1 | 12/2002 | Fleischman et al. |
| 2003/0179094 A1 | 9/2003 | Abreu |
| 2004/0027536 A1 | 2/2004 | Blum et al. |
| 2004/0116794 A1 | 6/2004 | Fink et al. |
| 2005/0045589 A1 | 3/2005 | Rastogi et al. |
| 2005/0221276 A1 | 10/2005 | Rozakis et al. |
| 2007/0016074 A1 | 1/2007 | Abreu |
| 2007/0030443 A1 | 2/2007 | Chapoy et al. |
| 2007/0121065 A1 | 5/2007 | Cox et al. |
| 2007/0188710 A1 | 8/2007 | Hetling et al. |
| 2008/0208335 A1 | 8/2008 | Blum et al. |
| 2008/0218696 A1 | 9/2008 | Mir |
| 2009/0033863 A1* | 2/2009 | Blum et al. ............... 351/160 R |
| 2009/0036761 A1 | 2/2009 | Abreu |
| 2009/0057164 A1 | 3/2009 | Minick et al. |
| 2009/0076367 A1 | 3/2009 | Sit et al. |
| 2009/0118604 A1 | 5/2009 | Phan et al. |
| 2009/0189830 A1 | 7/2009 | Deering et al. |
| 2009/0196460 A1 | 8/2009 | Jakobs et al. |
| 2010/0001926 A1 | 1/2010 | Amirparviz et al. |
| 2010/0013114 A1 | 1/2010 | Bowers et al. |
| 2010/0016704 A1 | 1/2010 | Naber et al. |
| 2010/0028559 A1 | 2/2010 | Yan et al. |
| 2010/0053549 A1* | 3/2010 | Legerton et al. ............... 351/162 |
| 2010/0072643 A1 | 3/2010 | Pugh et al. |
| 2010/0109175 A1 | 5/2010 | Pugh et al. |
| 2010/0110372 A1 | 5/2010 | Pugh et al. |
| 2010/0113901 A1 | 5/2010 | Zhang et al. |
| 2010/0133510 A1 | 6/2010 | Kim et al. |
| 2010/0249548 A1 | 9/2010 | Muller |
| 2011/0015512 A1 | 1/2011 | Pan et al. |
| 2011/0028807 A1 | 2/2011 | Abreu |
| 2011/0040161 A1 | 2/2011 | Abreu |
| 2011/0055317 A1 | 3/2011 | Vonog et al. |
| 2011/0063568 A1 | 3/2011 | Meng et al. |
| 2011/0084834 A1 | 4/2011 | Sabeta |
| 2011/0116035 A1 | 5/2011 | Fritsch et al. |
| 2011/0157541 A1 | 6/2011 | Peyman |
| 2011/0157544 A1 | 6/2011 | Pugh et al. |
| 2011/0184271 A1 | 7/2011 | Veciana et al. |
| 2011/0274680 A1 | 11/2011 | Mazed et al. |
| 2011/0286064 A1 | 11/2011 | Burles et al. |
| 2011/0298794 A1 | 12/2011 | Freedman |
| 2012/0026458 A1 | 2/2012 | Qiu et al. |
| 2012/0038881 A1 | 2/2012 | Amirparviz et al. |
| 2012/0041287 A1 | 2/2012 | Goodall et al. |
| 2012/0041552 A1 | 2/2012 | Chuck et al. |
| 2012/0069254 A1 | 3/2012 | Burton |
| 2012/0075168 A1 | 3/2012 | Osterhout et al. |
| 2012/0075574 A1 | 3/2012 | Pugh et al. |
| 2012/0078071 A1 | 3/2012 | Bohm et al. |
| 2012/0088258 A1 | 4/2012 | Bishop et al. |
| 2012/0092612 A1 | 4/2012 | Binder |
| 2012/0109296 A1 | 5/2012 | Fan |
| 2012/0177576 A1 | 7/2012 | Hu |
| 2012/0201755 A1 | 8/2012 | Rozakis et al. |
| 2012/0245444 A1 | 9/2012 | Otis et al. |
| 2012/0259188 A1 | 10/2012 | Besling |

FOREIGN PATENT DOCUMENTS

| | | |
|---|---|---|
| EP | 1061874 | 12/2000 |
| EP | 1617757 | 1/2006 |
| EP | 1818008 | 8/2007 |
| EP | 1947501 | 7/2008 |
| EP | 2457122 | 5/2012 |
| WO | 9504609 | 2/1995 |
| WO | 0116641 | 3/2001 |

(56) References Cited

FOREIGN PATENT DOCUMENTS

| WO | 0134312 | 5/2001 |
|---|---|---|
| WO | 03065876 | 8/2003 |
| WO | 2004060431 | 7/2004 |
| WO | 2004064629 | 8/2004 |
| WO | 2006015315 | 2/2006 |
| WO | 2009094643 | 7/2009 |
| WO | 2010105728 | 9/2010 |
| WO | 2010133317 | 11/2010 |
| WO | 2011/011344 | 1/2011 |
| WO | 2011034592 | 3/2011 |
| WO | 2011035228 | 3/2011 |
| WO | 2011035262 | 3/2011 |
| WO | 2011083105 | 7/2011 |
| WO | 2011163080 | 12/2011 |
| WO | 2012035429 | 3/2012 |
| WO | 2012037455 | 3/2012 |
| WO | 2012051167 | 4/2012 |
| WO | 2012051223 | 4/2012 |
| WO | 2012052765 | 4/2012 |

OTHER PUBLICATIONS

Parviz, Babak A., "Augmented Reality in a Contact Lens," IEEE Spectrum, Sep. 2009, http://spectrum.ieee.org/biomedical/bionics/augmented-reality-in-a-contact-lens/0, Last accessed Mar. 14, 2012, 6 pages.
Bionic contact lens 'to project emails before eyes,' http://www.kurzweilai.net/forums/topic/bionic-contact-lens-to-project-emails-before-eyes, Last accessed Mar. 14, 2012, 2 pages.
Tweedie, et al., "Contact creep compliance of viscoelastic materials via nanoindentation," J. Mater. Res., Jun. 2006, vol. 21, No. 2, pp. 1576-1589, Materials Research Society.
Brahim, et al., "Polypyrrole-hydrogel composites for the construction of clinically important biosensors," 2002, Biosensors & Bioelectronics, vol. 17, pp. 53-59.
Huang, et al., "Wrinkling of Ultrathin Polymer Films," Mater. Res. Soc. Symp. Proc., 2006, vol. 924, 6 pages, Materials Research Society.
Zarbin, et al., "Nanotechnology in ophthalmology," Can J Ophthalmol, 2010, vol. 45, No. 5, pp. 457-476.
Selner, et al., "Novel Contact Lens Electrode Array for Multi-electrode Electroretinography (meERG)," IEEE, 2011, 2 pages.
Liao, et al., "A 3-μW CMOS Glucose Sensor for Wireless Contact-Lens Tear Glucose Monitoring," IEEE Journal of Solid-State Circuits, Jan. 2012, vol. 47, No. 1, pp. 335-344.
Chen, et al., "Microfabricated Implantable Parylene-Based Wireless Passive Intraocular Pressure Sensors," Journal of Microelectromechanical Systems, Dec. 2008, vol. 17, No. 6, pp. 1342-1351.
Thomas, et al., "Functional Contact Lenses for Remote Health Monitoring in Developing Countries," IEEE Global Humanitarian Technology Conference, 2011, pp. 212-217, IEEE Computer Society.
Pandey, et al., "A Fully Integrated RF-Powered Contact Lens With a Single Element Display," IEEE Transactions on Biomedical Circuits and Systems, Dec. 2010, vol. 4, No. 6, pages.
Lingley, et al., "Multipurpose integrated active contact lenses," SPIE, 2009, 2 pages.
Chu, et al., "Soft Contact-lens Sensor for Monitoring Tear Sugar as Novel Wearable Device of Body Sensor Network," http://www.ksi.edu/seke/dms11/DMS/2_Kohji_Mitsubayashi.pdf, Last accessed Jul. 27, 2012, 4 pages.
Liao, et al., "A 3μW Wirelessly Powered CMOS Glucose Sensor for an Active Contact Lens," 2011 IEEE International Solid-State Circuits Conference, Session 2, Feb. 21, 2011, 3 pages.
Hurst, "How contact lenses could help save your life," Mail Online, Apr. 19, 2010, http://www.dailymail.co.uk/health/article-1267345/How-contact-lenses-help-save-life.html, Last accessed Jul. 27, 2012.
Lončar, et al., "Design and Fabrication of Silicon Photonic Crystal Optical Waveguides," Journal of Lightwave Technology, Oct. 2000, vol. 18, No. 10, pp. 1402-1411.
Liu, et al., "Miniature Amperometric Self-Powered Continuous Glucose Sensor with Linear Response," Analytical Chemistry, 7 pages.
Baxter, "Capacitive Sensors," 2000, 17 pages.
Lingley, et al., "A Single-Pixel Wireless Contact Lens Display," Journal of Micromechanics and Microengineering, 2011, 9 pages.
"Polyvinylidene fluoride," Wikipedia, http://en.wikipedia.org/wiki/Polyvinylidene_fluoride, Last accessed Mar. 30, 2012, 4 pages.
Murdan, "Electro-responsive drug delivery from hydrogels," Journal of Controlled Release, 2003, vol. 92, pp. 1-17.
Haders, "New Controlled Release Technologies Broaden Opportunities for Ophthalmic Therapies," Drug Delivery Technology, Jul./Aug. 2009, vol. 8, No. 7, pp. 48-53.
Singh, et al., "Novel Approaches in Formulation and Drug Delivery using Contact Lenses," Journal of Basic and Clinical Pharmacy, May 2011, vol. 2, Issue 2, pp. 87-101.
"Contact Lenses: Look Into My Eyes," The Economist, Jun. 2, 2011, http://www.economist.com/node/18750624/print, Last accessed Mar. 13, 2012, 8 pages.
Holloway, "Microsoft developing electronic contact lens to monitor blood sugar," Gizmag, Jan. 5, 2012, http://www.gizmag.com/microsoft-electronic-diabetic-contact-lens/20987/, Last accessed Mar. 13, 2012, 5 pages.
Unpublished U.S. Appl. No. 13/240,994, Titled "See-Through Display With Infrared Eye-Tracker," filed Sep. 22, 2011, 38 pages.
Unpublished U.S. Appl. No. 13/209,706, Titled "Optical Display System and Method with Gaze Tracking," filed Aug. 15, 2011, 30 pages.
Adler, "What types of statistical analysis do scientists use most often?" O'Reilly Community, Jan. 15, 2010, 2 pages, http://broadcast.oreilly.com/2010/01/what-types-of-statistical-anal.html, Last accessed Sep. 4, 2012.
Bull, "Different Types of Statistical Analysis," Article Click, Feb. 4, 2008, 4 pages, http://www.articleclick.com/Article/Different-Types-of-Statistical-Analysis/968252, Last accessed Sep. 4, 2012.
"Understanding pH measurement," Sensorland, 8 pages, http://www.sensorland.com/HowPage037.html, Last accessed Sep. 6, 2012.
"Regression analysis," Wikipedia, 11 pages, http://en.wikipedia.org/wiki/Regression_analysis, Last accessed Sep. 6, 2012.
"Statistics," Wikipedia, 10 pages, http://en.wikipedia.org/wiki/Statistics, Last accessed Sep. 6, 2012.
"Nonlinear regression," Wikipedia, 4 pages, http://en.wikipedia.org/wiki/Nonlinear_regression, Last accessed Sep. 10, 2012.
"Linear regression," Wikipedia, 15 pages, http://en.wikipedia.org/wiki/Linear_regression, Last accessed Sep. 10, 2012.
"Integrated circuit," Wikipedia, 9 pages, http://en.wikipedia.org/wiki/Integrated_circuit, Last accessed Sep. 10, 2012.
"Photolithography," Wikipedia, 8 pages, http://en.wikipedia.org/wiki/Photolithography, Last accessed Sep. 10, 2012.
"Alcohol Detection Technologies: Present and Future," American Beverage Institute, 9 pages.
Harding, et al., "Alcohol Toxicology for Prosecutors: Targeting Hardcore Impaired Drivers," American Prosecutors Research Institute, Jul. 2003, 40 pages.
Kim, et al., "Oral Alcohol Administration Disturbs Tear Film and Ocular Surface," American Academy of Ophthalmology, 2012, 7 pages.
Quick, "Color-changing electrochromic lens technology has fashion and military applications," Gizmag, Jul. 12, 2011, http://www.gizmag.com/electrochromic-lens-technology/19191/, Last accessed Apr. 12, 2012, 4 pages.
Chu, "Contact Lenses that Respond to Light," Technology Review, Nov. 10, 2009, http://www.technologyreview.com/printer_friendly_article.aspx?id=23922, Last accessed Apr. 12, 2012, 2 pages.
Badugu et al., "A Glucose Sensing Contact Lens: A Non-Invasive Technique for Continuous Physiological Glucose Monitoring," Journal of Fluorescence, Sep. 2003, pp. 371-374, vol. 13, No. 5.
Carlson et al., "A 20 mV Input Boost Converter With Efficient Digital Control for Thermoelectric Energy Harvesting," IEEE Journal of Solid-State Circuits, Apr. 2010, pp. 741-750, vol. 45, No. 4.
Chu et al., "Biomedical soft contact-lens sensor for in situ ocular biomonitoring of tear contents," Biomed Microdevices, 2011, pp. 603-611, vol. 13.

(56) References Cited

OTHER PUBLICATIONS

Chu et al., "Soft contact lens biosensor for in situ monitoring of tear glucose as non-invasive blood sugar assessment," Talanta, 2011, pp. 960-965, vol. 83.

Ho et al., "Contact Lens With Integrated Inorganic Semiconductor Devices," MEMS 2008. IEEE 21st International Conference on. IEEE, 2008., pp. 403-406.

Lähdesmäki et al., "Possibilities for Continuous Glucose Monitoring by a Functional Contact Lens," IEEE Instrumentation & Measurement Magazine, Jun. 2010, pp. 14-17.

Lingley et al., "A contact lens with integrated micro solar cells," Microsyst Technol, 2012, pp. 453-458, vol. 18.

Parviz, Babak A., "For Your Eyes Only," IEEE Spectrum, Sep. 2009, pp. 36-41.

Saeedi, E. et al., "Self-assembled crystalline semiconductor optoelectronics on glass and plastic," J. Micromech. Microeng., 2008, pp. 1-7, vol. 18.

Saeedi et al., "Self-Assembled Inorganic Micro-Display on Plastic," Micro Electro Mechanical Systems, 2007. MEMS. IEEE 20th International Conference on. IEEE, 2007., pp. 755-758.

Sensimed Triggerfish, Sensimed Brochure, 2010, 10 pages.

Shih, Yi-Chun et al., "An Inductorless DC-DC Converter for Energy Harvesting With a 1.2-μW Bandgap-Referenced Output Controller," IEEE Transactions on Circuits and Systems-II: Express Briefs, Dec. 2011, pp. 832-836, vol. 58, No. 12.

Shum et al., "Functional modular contact lens," Proc. of SPIE, 2009, pp. 73970K-1 to 73970K-8, vol. 7397.

Stauth et al., "Self-assembled single-crystal silicon circuits on plastic," PNAS, Sep. 19, 2006, pp. 13922-13927, vol. 103, No. 38.

Yao, H. et al., "A contact lens with integrated telecommunication circuit and sensors for wireless and continuous tear glucose monitoring," J. Micromech. Microeng., 2012, pp. 1-10, vol. 22.

Yao, H. et al., "A Dual Microscal Glucose Sensor on a Contact Lens, Tested in Conditions Mimicking the Eye," Micro Electro Mechanical Systems (MEMS), 2011 IEEE 24th International Conference on. IEEE, 2011, pp. 25-28.

Yao et al., "A contact lens with embedded sensor for monitoring tear glucose level," Biosensors and Bioelectronics, 2011, pp. 3290-3296, vol. 26.

Yao, H. et al., "A Soft Hydrogel Contact Lens with an Encapsulated Sensor for Tear Glucose Monitoring," Micro Electro Mechanical Systems (MEMS), 2012 IEEE 25th International Conference on. IEEE, 2012, pp. 769-772.

Yeager et al., "A 9 μA, Addressable Gen2 Sensor Tag for Biosignal Acquistion," IEEE Journal of Solid-State Circuits, Oct. 2010, pp. 2198-2209, vol. 45, No. 10.

Zhang et al., "Design for Ultra-Low Power Biopotential Amplifiers for Biosignal Acquistion Applications," IEEE Transactions on Biomedical Circuits and Systems, 2012, pp. 344-355, vol. 6, No. 4.

\* cited by examiner

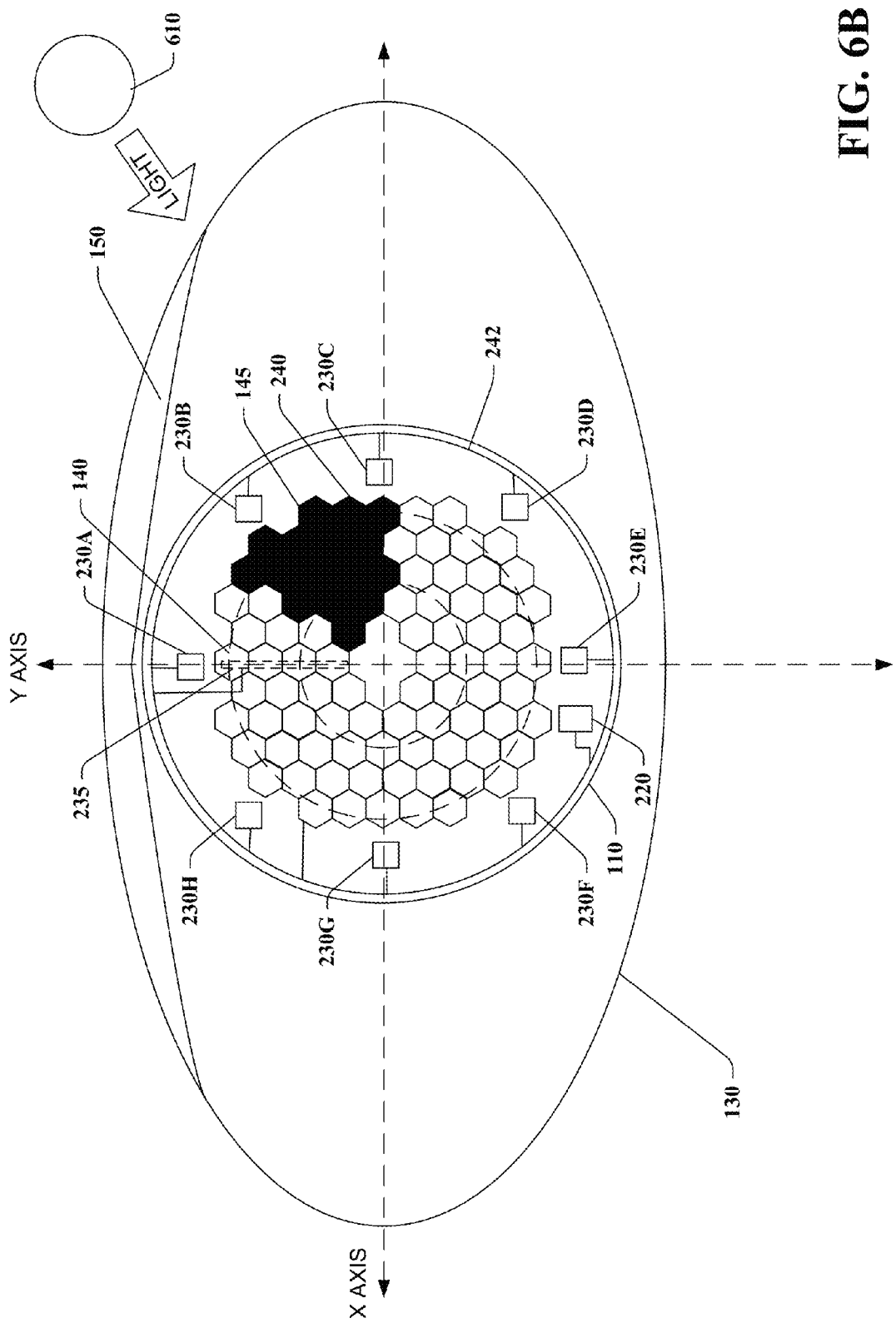

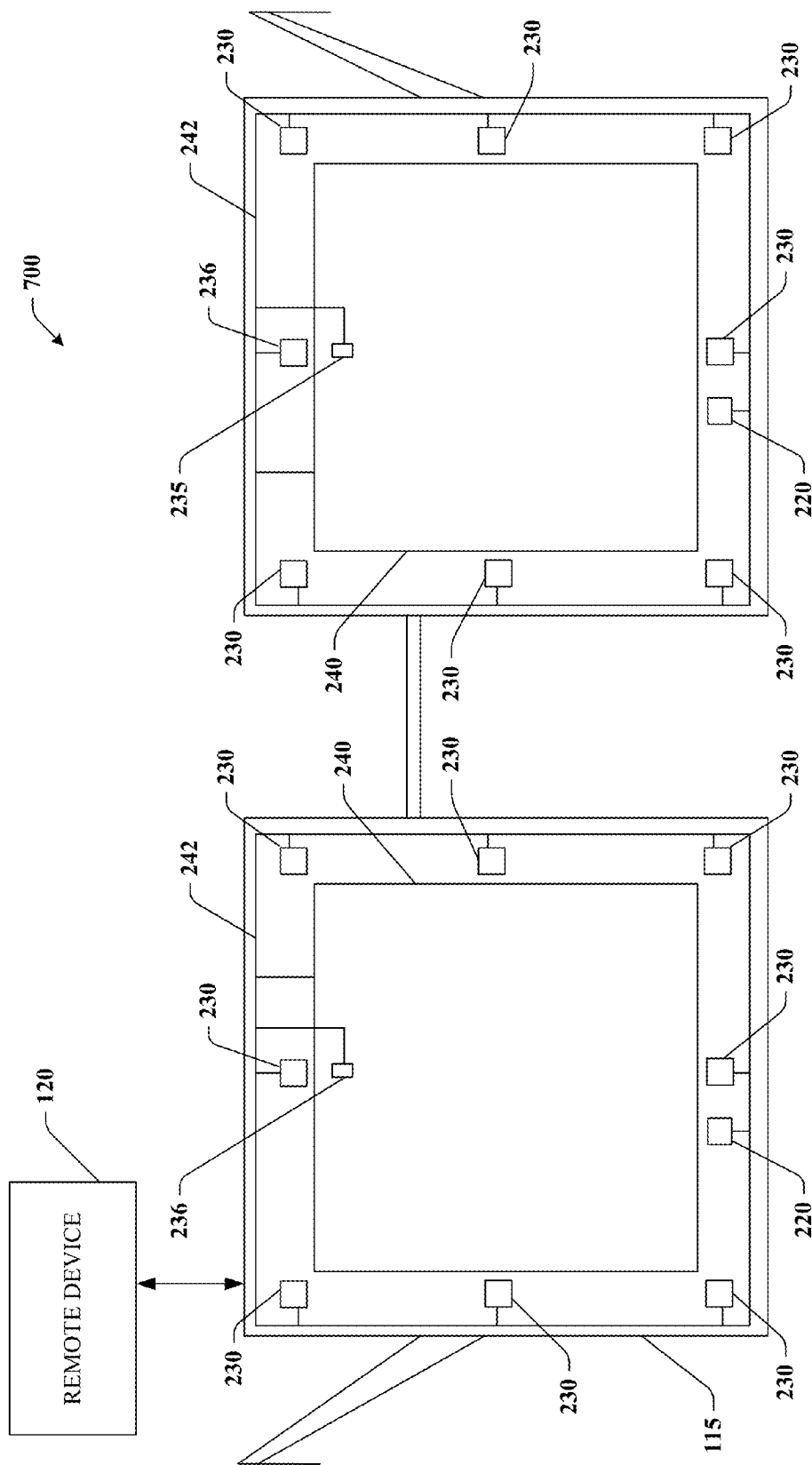

US 8,960,898 B1

CONTACT LENS THAT RESTRICTS INCOMING LIGHT TO THE EYE

TECHNICAL FIELD

This disclosure generally relates to systems and/or methods to restrict light entering an opening of an eye pupil by detecting pupil dilation, detecting incoming light intensity or direction, and adjusting light restricting properties of one or more light restricting regions of the contact lens based in part upon detected pupil dilation parameters and incoming light intensity or direction.

BACKGROUND

The human eye can restrict amount of light entering an eye by adjusting size of an opening of a pupil. For example, in dim ambient light conditions the pupil will dilate the opening and in brighter ambient light conditions the pupil will contract the opening. However, the pupil has maximum and minimum limits to which it can adjust size of the opening. To compensate for very bright ambient light conditions, a person will generally attempt to squint their eyelids to further restrict the amount of light entering the opening of the pupil.

BRIEF DESCRIPTION OF THE DRAWINGS

FIG. 6B illustrates a diagram of close-up view a non-limiting exemplary light restricting contact lens on eye with light source in a second position and light restricting material adjusted according to the position of the light source in accordance with an implementation of this disclosure.

FIG. 7 illustrates a diagram of an exemplary non-limiting system for restricting some portion of light entering an eye using a pair of eyeglasses in accordance with an implementation of this disclosure.

DETAILED DESCRIPTION

Overview

Figure 1A:
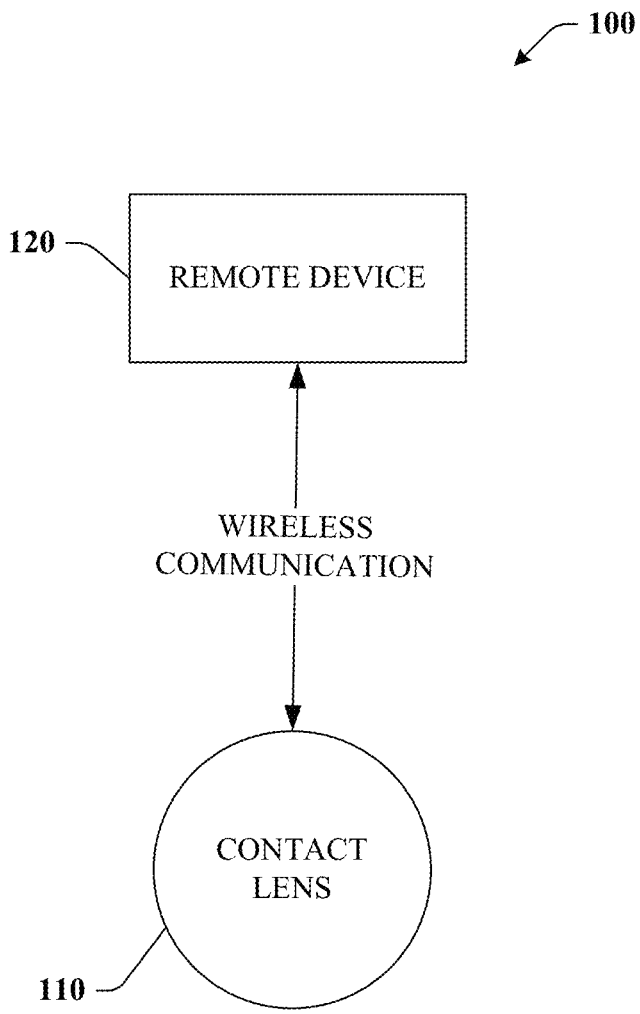
FIG. 1A illustrates a diagram of an exemplary non-limiting system for restricting some portion of light entering an eye using a contact lens in accordance with an implementation of this disclosure.

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of this disclosure may be practiced without these specific details, or with other methods, components, materials, etc. In other instances, well-known structures and devices are shown in block diagram form to facilitate describing this disclosure.

In accordance with various disclosed aspects, a mechanism is provided for restricting light from entering an eye via light restricting components disposed on or within a contact lens (hereinafter referred to as "light restricting contact lens"). It is to be appreciated that the light restricting contact lens can restrict light to an opening significantly smaller than achievable by a pupil of an eye. Furthermore, light restricting contact lens can restrict light through areas of light restricting contact lens corresponding to respective directions of one or more sources of incoming light, without restricting light through other areas of light restricting contact lens. For example, a light restricting contact lens can dynamically change opacity of one or more of its regions to restrict some portion of light entering the eye. In an embodiment, light restricting contact lens can receive commands from a remote device or user to restrict some portion of light entering the eye. In another embodiment, light restricting contact lens can monitor intensity and/or direction of light ambient to the wearer of the light restricting contact lens and dynamically restrict some portion of light entering the eye. Additionally, light restricting contact lens can monitor pupil dilation to determine maximum and/or minimum limits of the opening of the pupil and, for example, activate restriction of light entering the eye based upon detected light conditions and detected pupil dilation. It is to be appreciated that light restricting contact lens can be employed in connection with a human user or a non-human user (e.g., dogs or other species with eyes). Additionally, components on or within a contact lens can be of a suitable shape, size, opacity, and/or positioned so as not to obstruct vision through an opening of a pupil when worn.

Referring now to the drawings, FIG. 1A depicts a system 100 for restricting some portion of light entering an eye. System 100 includes a light restricting contact lens 110 that restricts some portion of light entering the eye. Furthermore, light restricting contact lens 110 can communicate with a remote device 120 in connection with operations associated with the remote device 120 or light restricting contact lens 110 (e.g., adjusting light restricting properties of one or more areas of light restricting contact lens 110, requesting instructions or information, sending commands or information, or any other suitable function). Light restricting contact lens 110 and remote device 120 can also receive input from users, for example to control restriction of some portion of light entering the eye, see e.g., FIG. 11 and corresponding disclosure.

Figure 11:
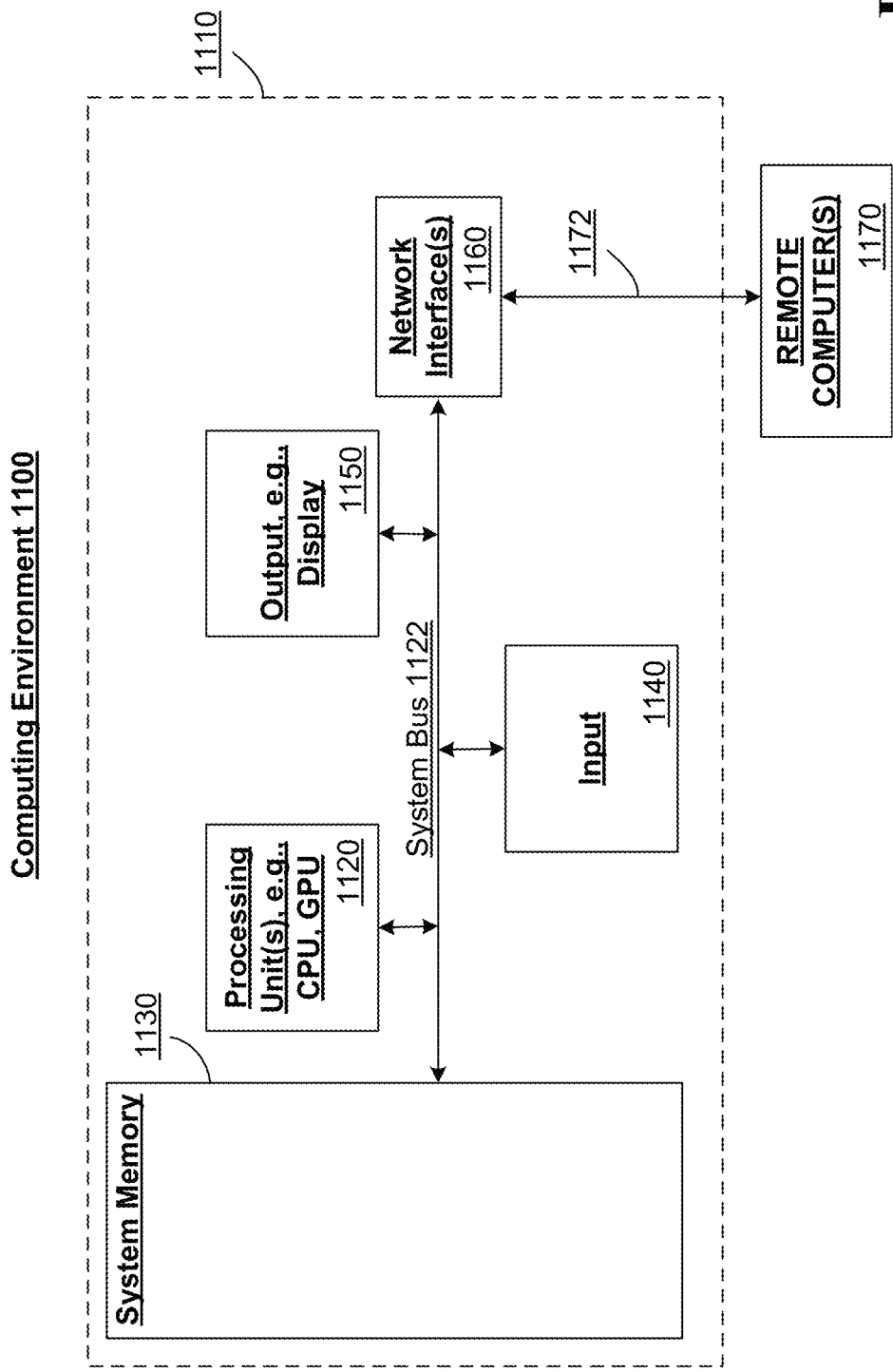
FIG. 11 is a block diagram representing an exemplary non-limiting computing system or operating environment in which the various embodiments can be implemented.

Light restricting contact lens 110 and remote device 120, respectively include a memory that stores computer executable components and a processing circuit or processor that executes computer executable components stored in the memory (see e.g., FIG. 11). Light restricting contact lens 110 and remote device 120 can communicate via a wireless network. It is to be appreciated that while only one remote device 120 is depicted, light restricting contact lens 110 can communicate with any suitable number of remote devices 120 concurrently, serially, an ad hoc manner, or in accordance with any suitable protocol. Additionally, remote device 120 can communicate with any suitable number of light restricting contact lenses 110 concurrently, serially, an ad hoc manner, or in accordance with any suitable protocol.

Remote device 120 can include a wearable device or a non-wearable device. Wearable device can include, for example, heads-up display glasses, a monocle, eyeglasses, sunglasses, a headset, a visor, a cap, a helmet, a mask, a headband, clothing, or any other suitable device that can be worn by a human or non-human user and can communicate with light restricting contact lens 110 remotely. Non-wearable device can include, for example, a mobile device, a mobile phone, a camera, a camcorder, a video camera, personal data assistant, laptop computer, tablet computer, desktop computer, server system, cable set top box, satellite set top box, cable modem, television set, monitor, media extender device, blu-ray device, DVD (digital versatile disc or digital video disc) device, compact disc device, video game system, portable video game console, audio/video receiver, radio device, portable music player, navigation system, car stereo, or any suitable device that can communicate with light restricting contact lens 110 remotely. Moreover, remote device 120 and light restricting contact lens 110 can include a display and/or user interface (e.g., a web browser or application), that can generate, receive and/or present graphical indicia (e.g., displays, text, video . . . ) generated locally or remotely.

Figure 1B:
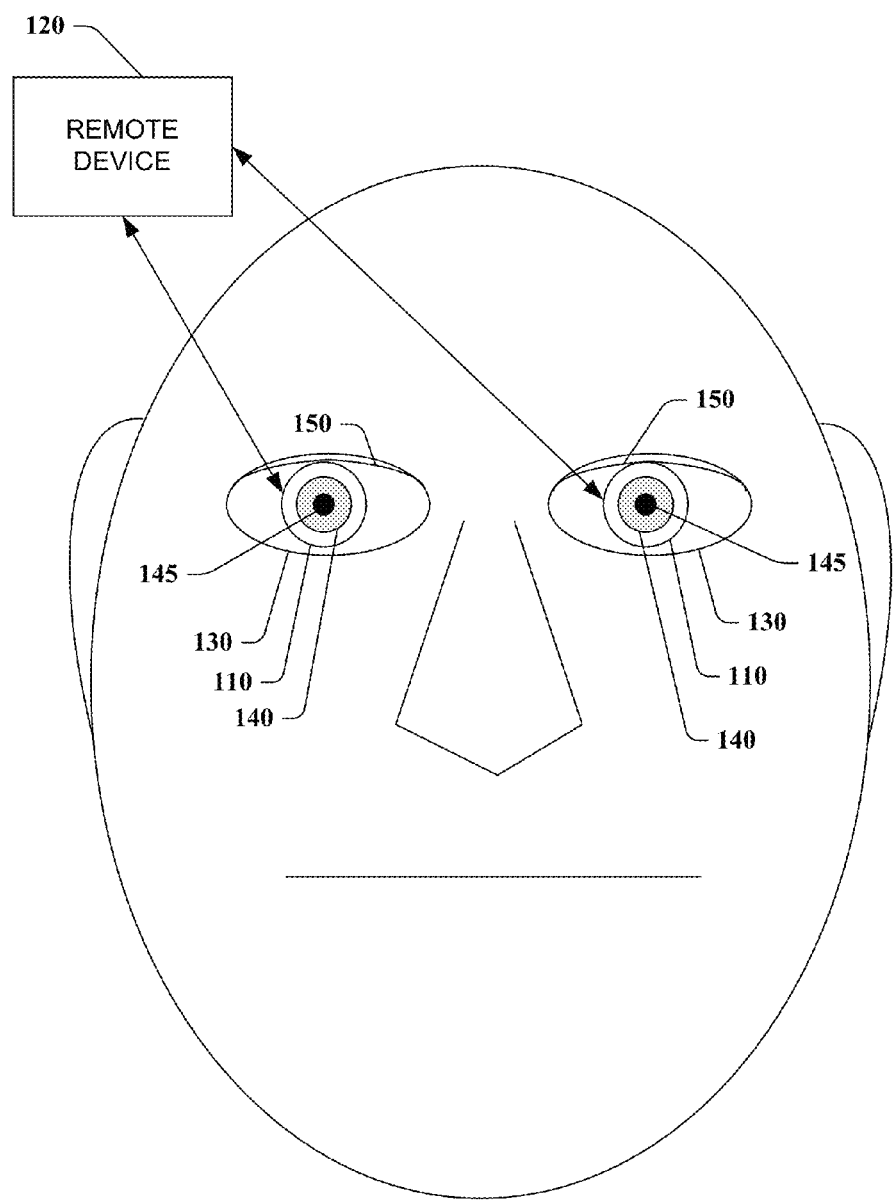
FIG. 1B illustrates a diagram of the exemplary non-limiting system of FIG. 1A worn on both eyes of a human user in accordance with an implementation of this disclosure.

Referring to FIG. 1B, system 100 is depicted on a human user. Light restricting contact lenses 110 are shown worn on both eyes 130, covering irises 140 and pupils 145 while eyelids 150 are open. Remote device 120 is shown with one or more transceivers (not shown) arranged to communicate wirelessly with light restricting contact lenses 110. It is to be appreciated that respective transceivers of remote device 120 can have transmission power and/or signal reception sensitivity suitable for transmitting a signal to and receiving a signal from an associated light restricting contact lens 110 on an eye without interfering with another light restricting contact lens 110 on another eye. While FIG. 1B illustrates a light restricting contact lenses 110 arrangement in both eyes, it is to be appreciated that an arrangement with a light restricting contact lens 110 on one eye can be employed (e.g., on a person with a damaged pupil in one eye).

Figure 2A:
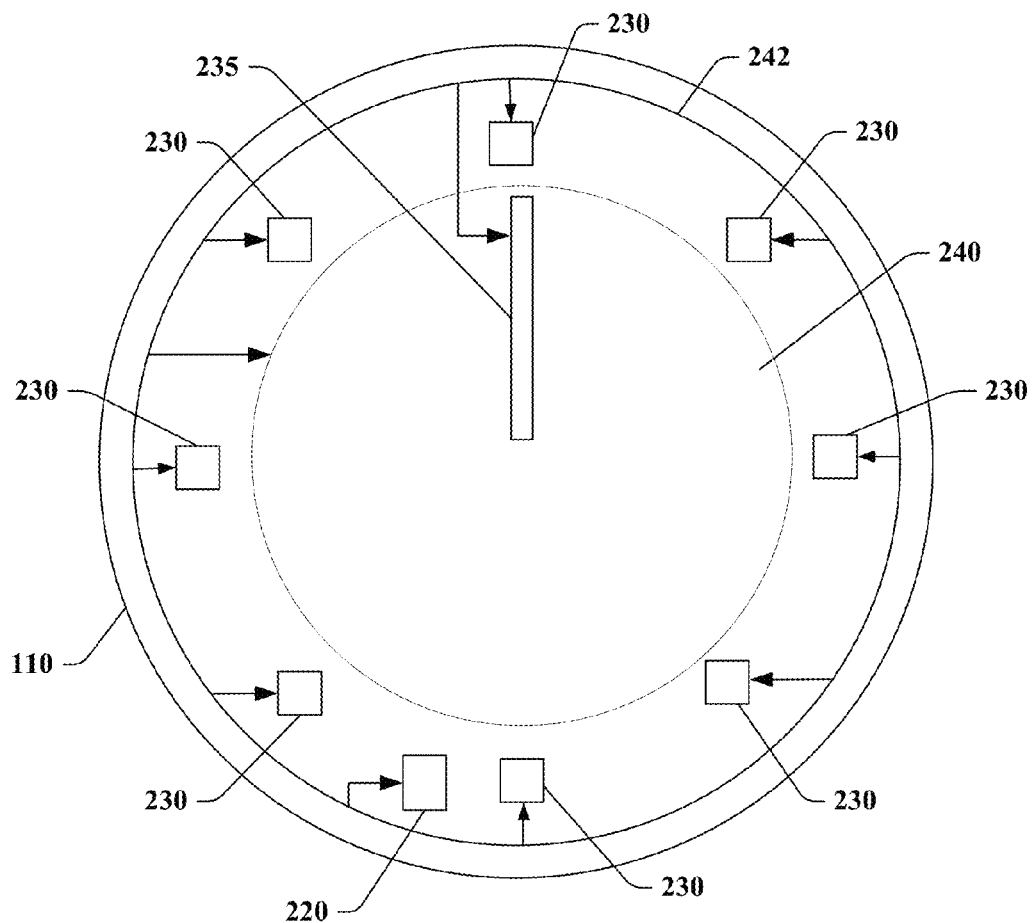
FIG. 2A illustrates a diagram of an exemplary non-limiting light restricting contact lens in accordance with an implementation of this disclosure.

Referring to FIG. 2A, light restricting contact lens 110 is depicted that includes, disposed on or within its substrate, a control circuit 220, one or more light sensors 230 (in this non-limiting example, eight light sensors 230 equally space near the periphery of light restricting contact lens 110), and a pupil sensor 235. Control circuit 220, light sensors 230, and pupil sensor 235 are coupled wirelessly or via wire by coupling 242. It should be noted that pupil sensor 235 or all or some light sensors 230 can have independent coupling to control circuit 220. Different aspects of interaction between control circuit 220 and light sensors 230 or pupil sensor 235 can be respectively coupled via wire or wirelessly. In one example, all interactions are coupled via wire. In another example, all interactions are coupled wirelessly. In a further example, some interactions are coupled wirelessly, while other interactions are coupled via wire. For example, communication interaction can be coupled wirelessly, while power supply interactions can be coupled via wire. Light sensor 230 can be any suitable sensor for detecting intensity, wavelength, and/or direction of light. In an embodiment, light sensor 230 can be a photodiode or photo detector. It is to be appreciated that pupil sensor 235 and respective light sensors 230 can respectively be uniquely identifiable to control circuit 220, for example, via an identifier signal or identifying information conveyed from pupil sensor 235 or respective light sensors 230 to control circuit 220.

Figure 2B:
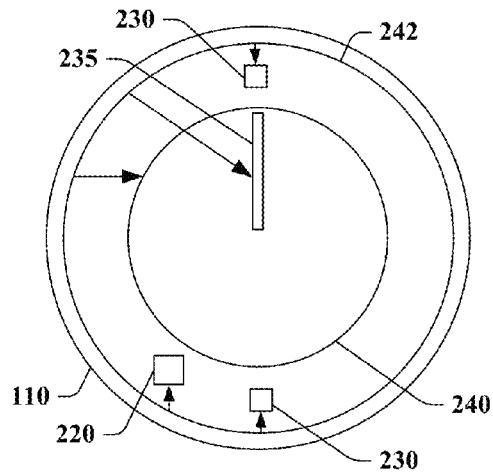
FIG. 2B illustrates a diagram of an exemplary non-limiting light restricting contact lens with two sensors respectively aligned at top and bottom of light restricting contact lens in accordance with an implementation of this disclosure.
Figure 2C:
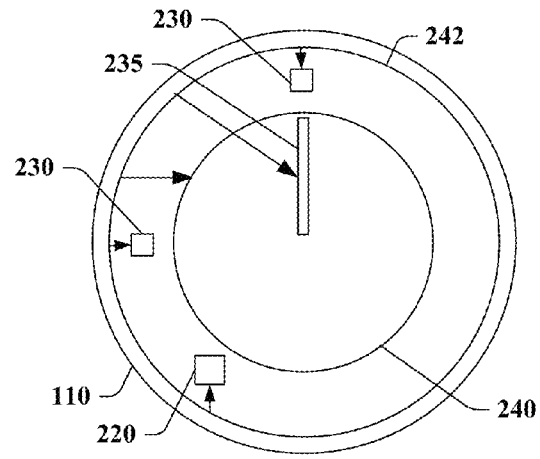
FIG. 2C illustrates a diagram of an exemplary non-limiting light restricting contact lens with two sensors respectively aligned at a bottom and one side of light restricting contact lens in accordance with an implementation of this disclosure.
Figure 2D:
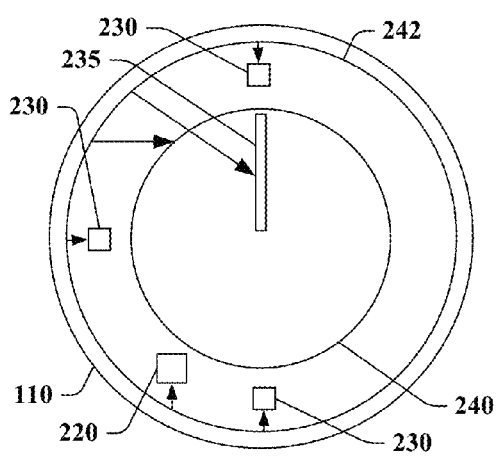
FIG. 2D illustrates a diagram of an exemplary non-limiting light restricting contact lens with three sensors respectively aligned at top, bottom, and one side of light restricting contact lens in accordance with an implementation of this disclosure.
Figure 2E:
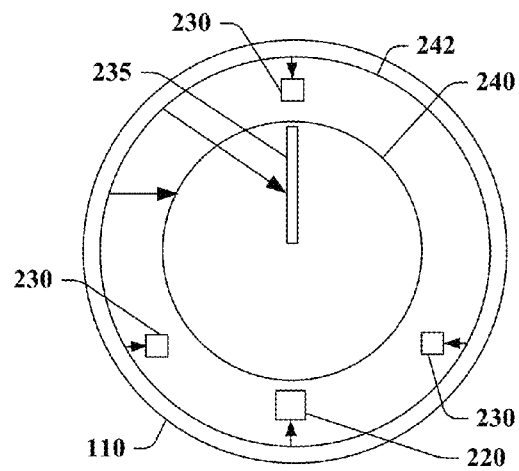
FIG. 2E illustrates a diagram of an exemplary non-limiting light restricting contact lens with three sensors aligned in an equilateral triangular shape near a periphery of light restricting contact lens in accordance with an implementation of this disclosure.
Figure 2F:
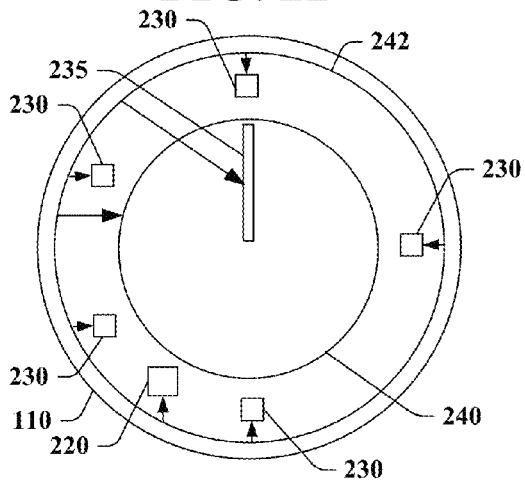
FIG. 2F illustrates a diagram of an exemplary non-limiting light restricting contact lens with five sensors aligned in a pentagon shape near a periphery of light restricting contact lens in accordance with an implementation of this disclosure.
Figure 2G:
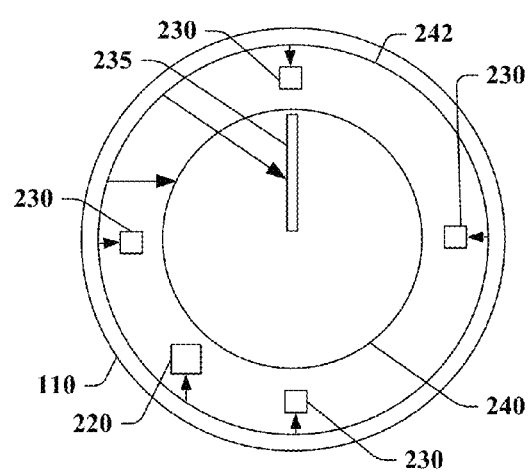
FIG. 2G illustrates a diagram of an exemplary non-limiting light restricting contact lens 110 with four light sensors 230 aligned at top, bottom, and both side near a periphery of at top, bottom, and one side of light restricting contact lens in accordance with an implementation of this disclosure.

Referring to FIGS. 2B-G, various exemplary configurations of light sensors 230 on or within a light restricting contact lens 110 are illustrated. Light sensors 230 can be arranged on or within light restricting contact lens 110 to face outward away from eye 130 when light restricting contact lens 110 is worn. In an embodiment, light restricting contact lens 110 can be weighted to self-align into a particular position when worn, similar to a toric contact lens. For example, light sensors 230 may require specific positioning based upon arrangement of light restricting materials 240 (e.g. a custom lens designed to compensate for a partially damaged pupil). In another embodiment, light restricting contact lens 110 is not weighted. For example, light sensors 230 can be employed in an arrangement, such as eight light sensors 230 equally spaced around a periphery of light restricting contact lens 110 to operate in most any orientation of the light restricting contact lens 110. FIG. 2B shows a light restricting contact lens 110 with two light sensors 230 respectively aligned at top and bottom of light restricting contact lens 110. FIG. 2C illustrates a light restricting contact lens 110 with two light sensors 230 respectively aligned at a bottom and one side of light restricting contact lens 110. FIG. 2D depicts a light restricting contact lens 110 with three light sensors 230 respectively aligned at top, bottom, and one side of light restricting contact lens 110. In an example, respective left and right light restricting contact lenses 110 can have side light sensors 230 arranged at opposite sides to detect light entering from a periphery. FIG. 2E illustrates a light restricting contact lens 110 with three light sensors 230 aligned in an equilateral triangular shape near a periphery of light restricting contact lens 110. FIG. 2F depicts a light restricting contact lens 110 with five light sensors 230 aligned in a pentagon shape near a periphery of light restricting contact lens 110. FIG. 2G illustrates a light restricting contact lens 110 with four light sensors 230 aligned at top, bottom, and both sides near a periphery of light restricting contact lens 110. Employing a plurality of uniquely identifiable light sensors 230 allows for detecting direction of one or more sources of incoming light to light restricting contact lens 110. Any suitable number of light sensors 230 can be respectively placed in any suitable locations of light restricting contact lens 110. It is to be appreciated that increasing number of light sensors 230, for example distributed about a periphery of the light restricting contact lens 110, can increase precision or granularity of determining (or inferring) direction of one or more sources of incoming light to light restricting contact lens 110.

Referring back to FIG. 2A, light restricting contact lens 110 includes, disposed on or within its substrate, a light restricting material 240 coupled to control circuit 220. In this non-limiting example, light restricting material 240 covers an area of a center of light restricting contact lens 110. Light restricting material 240 can be any suitable material that is electronically configurable to restrict some portion of light. It is to be appreciated that, restricting some portion of light can include restricting all visible or non-visible wavelengths of light or a subset of the wavelengths. In an embodiment, light restricting material 240 is an electrochromic material which can be configured to restrict some portion of light based upon an electronic signal. In another embodiment, light restricting material 240 includes a mechanical aperture of which a size or shape of an opening of the aperture can be configured based upon an electronic signal. Light restricting material 240 can be partitioned into different areas which respectively include different types of light restricting materials 240. For example, some light restricting material 240 areas can include electrochromic material while other light restricting material 240 areas include a mechanical aperture.

Figure 3A:
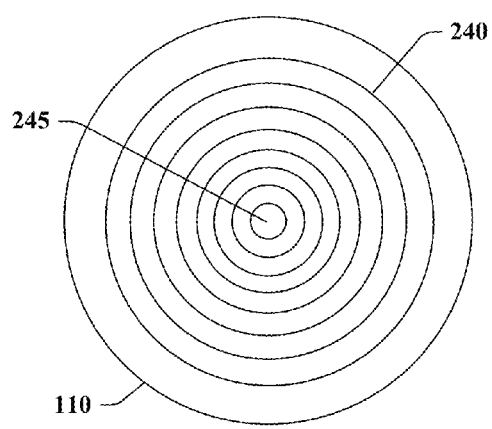
FIG. 3A illustrates a diagram of an exemplary non-limiting light restricting contact lens with light restricting material configured in seven concentrically smaller ring light restricting material areas in accordance with an implementation of this disclosure.
Figure 3B:
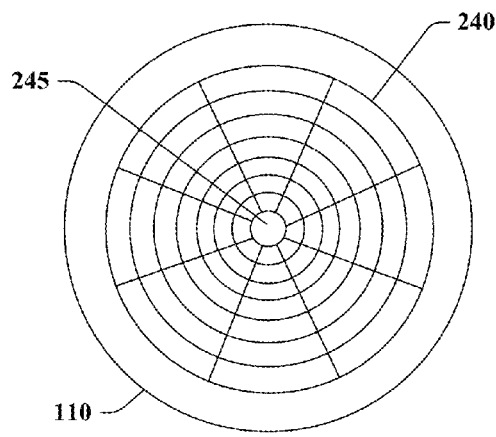
FIG. 3B illustrates a diagram of an exemplary non-limiting light restricting contact lens with light restricting material configured in seven concentrically smaller ring light restricting material areas as depicted in FIG. 3A further divided into eight pie shaped areas in accordance with an implementation of this disclosure.
Figure 3C:
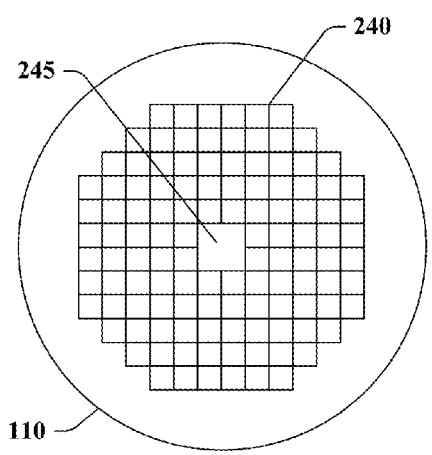
FIG. 3C illustrates a diagram of an exemplary non-limiting light restricting contact lens with light restricting material configured in an array of square light restricting material areas, with a non-light restricting area in accordance with an implementation of this disclosure.
Figure 3D:
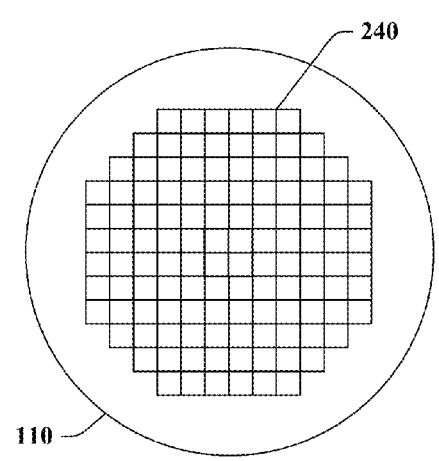
FIG. 3D illustrates a diagram of an exemplary non-limiting light restricting contact lens with light restricting material configured in an array of square light restricting material areas similar to FIG. 3C, however, also covering the central area depicted as non-light restricting area in FIG. 3C in accordance with an implementation of this disclosure.
Figure 3E:
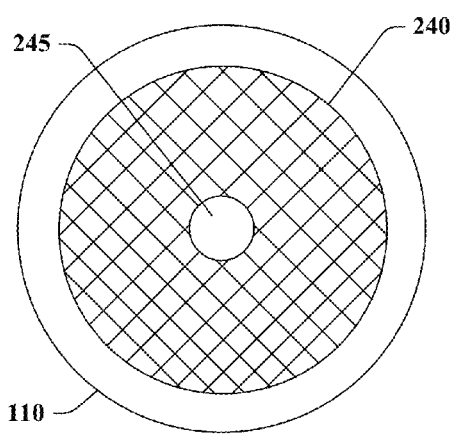
FIG. 3E illustrates a diagram of an exemplary non-limiting light restricting contact lens with light restricting material configured in an overall donut shape partitioned into an array of various shaped light restricting material areas in accordance with an implementation of this disclosure.
Figure 3F:
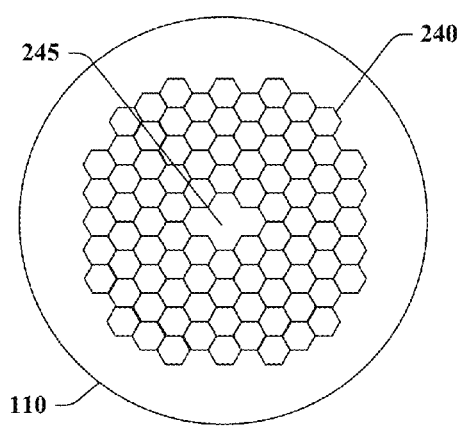
FIG. 3F illustrates a diagram of an exemplary non-limiting light restricting contact lens with light restricting material configured in an array of hexagon light restricting material areas in accordance with an implementation of this disclosure.

Referring to FIGS. 3A-F, various exemplary configurations of light restricting material 240 on or within a light restricting contact lens 110 are shown. Control circuit 220, light sensors 230, pupil sensor 235, and coupling 240 exist but are not shown in FIGS. 3A-F to minimize obfuscation of the illustrated configurations of light restricting material 240. FIG. 3A shows a light restricting contact lens 110 with light restricting material 240 configured in seven concentrically smaller ring light restricting material 240 areas with a non-light restricting area 245 in the center. Non-light restricting area 245 in the center of light restricting contact lens 110 does not contain light restricting material 240 to avoid obstructing light entering pupil 145 from this area. In an embodiment, non-light restricting area 245 is of a size smaller than a minimum opening of pupil 145. FIG. 3B depicts light restricting contact lens 110 with light restricting material 240 configured in seven concentrically smaller ring light restricting material 240 areas as shown in FIG. 3A and further divided into eight pie shaped areas. FIG. 3C shows light restricting contact lens 110 with light restricting material 240 configured in an array of square light restricting material 240 areas, also with a non-light restricting area 245. FIG. 3D illustrates light restricting contact lens 110 with light restricting material 240 configured in an array of square light restricting material 240 areas similar to FIG. 3C, however, also covering central non-light restricting area 245. FIG. 3E depicts light restricting contact lens 110 with light restricting material 240 configured in an overall donut shape partitioned into an array of various shaped light restricting material 240 areas, also with a non-light restricting area 245. FIG. 3F illustrates light restricting contact lens 110 with light restricting material 240 configured in an array of hexagon light restricting material 240 areas, also with non-light restricting area 245.

Figure 3G:
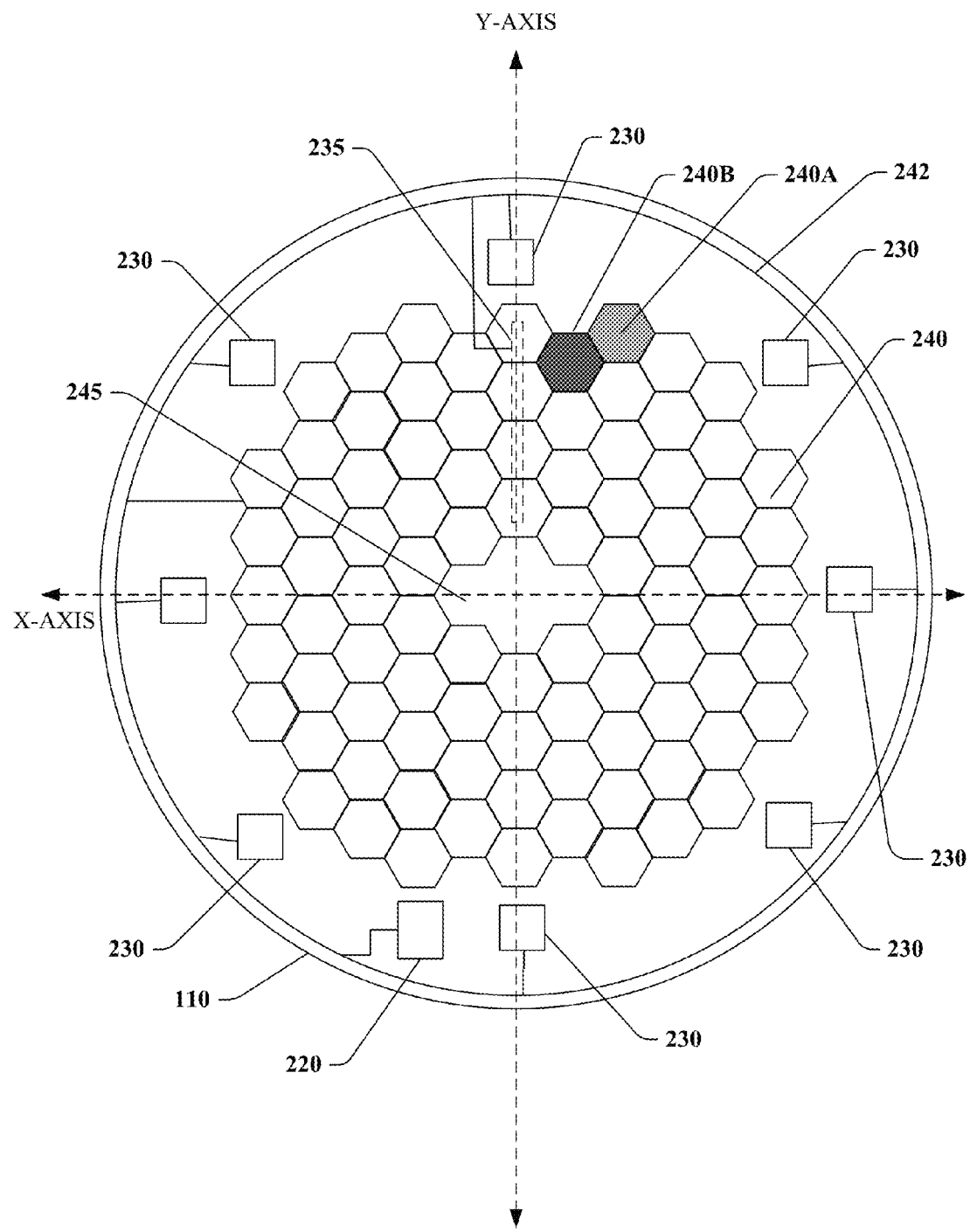
FIG. 3G illustrates a diagram of an exemplary non-limiting light restricting contact lens with light restricting material configured similar to FIG. 3F with respective light restricting material areas that are individually configurable in accordance with an implementation of this disclosure.

Referring to FIG. 3G, light restricting contact lens 110 is illustrated with light restricting material 240 configured similar to FIG. 3F. Respective light restricting material 240 areas can be individually configurable, identifiable, or addressable by control circuit 220. For example, light restricting material area 240A can be configured to have light restricting properties associated with a first level of light restriction while light restricting material area 240B can be configured to have light restricting properties associated with a second level of light restriction. Furthermore, any suitable number and/or shapes of light restricting material 240 areas can be respectively placed in any suitable locations of light restricting contact lens 110. It is also to be appreciated that increasing number and/or shapes of light restricting material 240 areas can provide greater precision or granularity of patterns of light restriction on light restricting contact lens 110, e.g., to provide varying levels of light restriction on different areas of light restricting contact lens 110 based upon intensity wavelength, and/or direction of incoming light. In an embodiment, light restricting material 240 can be centered about a geometric center of light restricting contact lens 110.

Figure 3H:
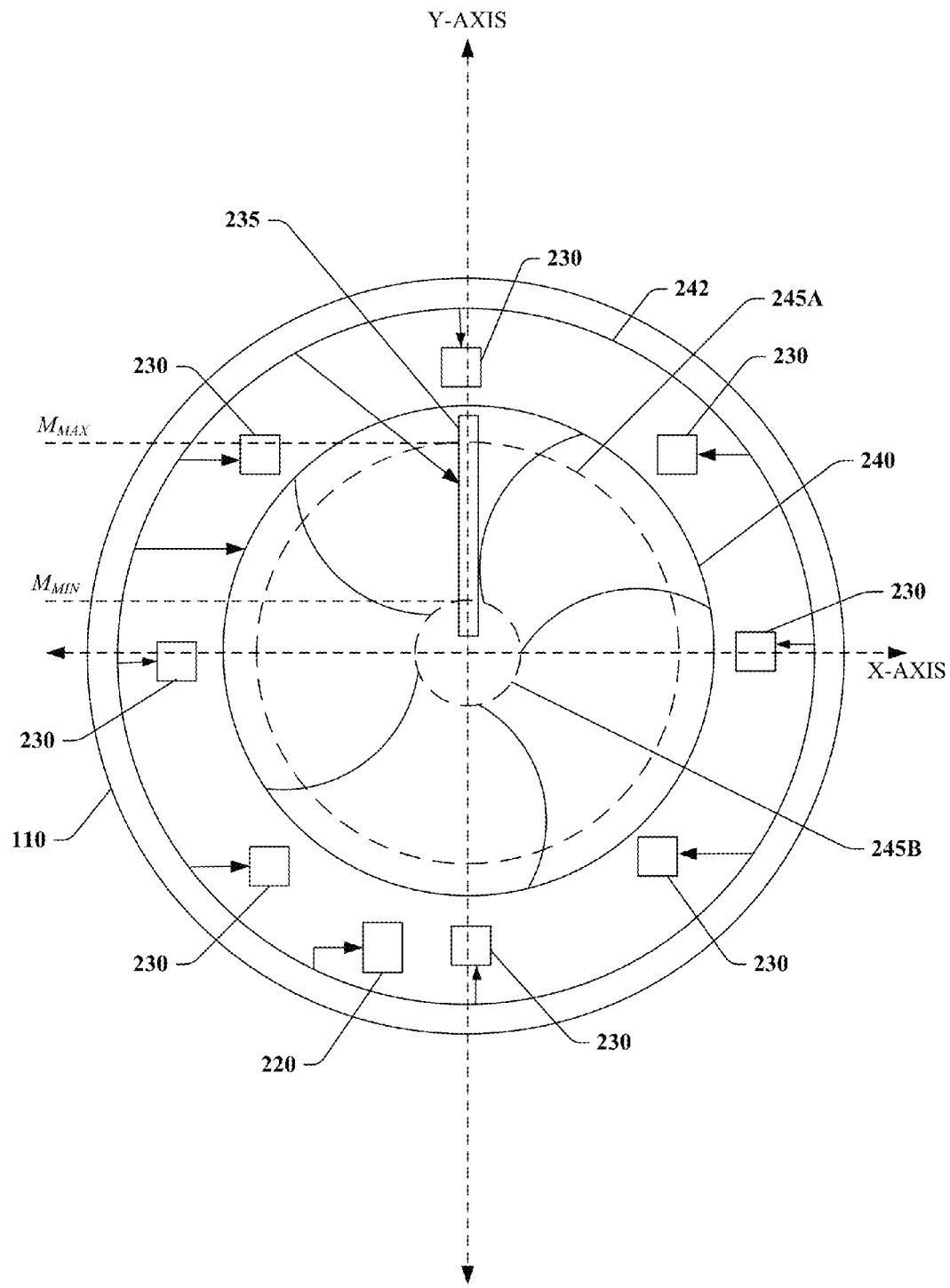
FIG. 3H illustrates a diagram of an exemplary non-limiting light restricting contact lens with light restricting material configured as a mechanical aperture in accordance with an implementation of this disclosure.

Referring to FIG. 3H, light restricting contact lens 110 is depicted with light restricting material 240 configured as a mechanical aperture. In an embodiment, mechanical aperture is centered about a geometric center of light restricting contact lens 110. Mechanical aperture has an opening with size M that can be adjusted between a maximum $M_{MAX}$ size and a minimum size $M_{MIN}$. It is to be appreciated that $M_{MAX}$ can be greater that a maximum size of an opening of pupil 145 so as not to obstruct pupil 145 when light restricting contact lens 110 is not actively restricting some portion of light from entering eye 130. It is to be further appreciated that $M_{MIN}$ can be smaller than a minimum size of an opening of pupil 145 so as to provide greater restriction of light entering eye 130 than can be achieved by pupil 145. Light restricting contact lens 110 can adjust M based upon intensity, wavelength, and/or direction of incoming light to light restricting contact lens 110. For example, when an intensity of incoming light decreases, light restricting contact lens 110 can increase M, or when intensity of incoming light increases, light restricting contact lens 110 can decrease M.

Figure 4:
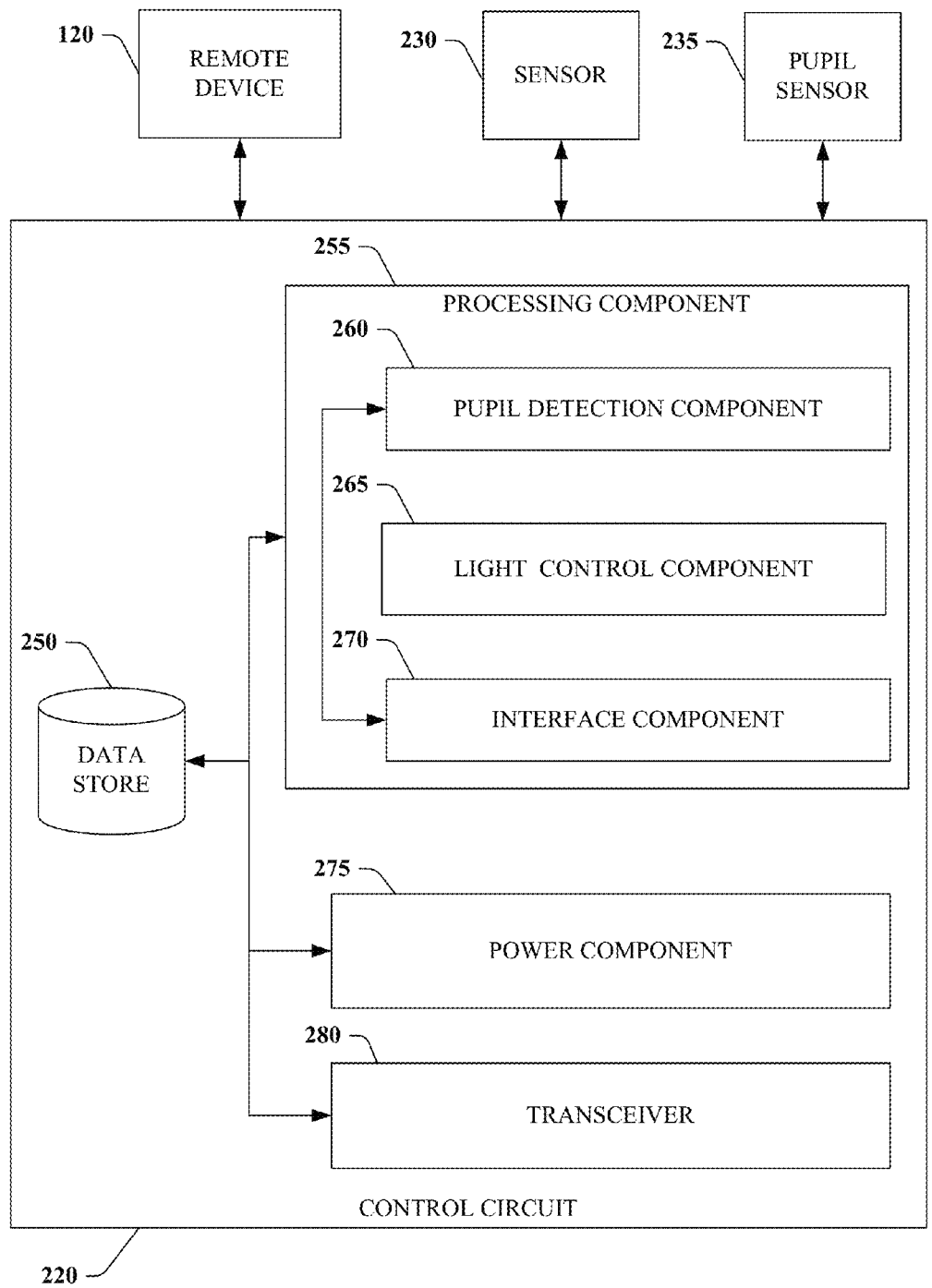
FIG. 4 illustrates a diagram of an exemplary non-limiting control circuit in accordance with an implementation of this disclosure.

Referring to FIG. 4, control circuit 220 includes processing component 255 that restricts some portions of light from passing through light restricting contact lens 110, and communicates with remote device 120, light sensor 230, and pupil sensor 235. Control circuit 220 can include power component 275 that manages, receives, generates, stores, and/or distributes electrical power to other components of light restricting contact lens 110. Control circuit 220 can also include one or more transceivers 280 for transmitting or receiving signals to or from remote device 120, light sensor 230, or pupil sensor 235. Light sensor 230 or pupil sensor 235 can interface directly with processing component 255 without need to employ transceiver 280, for example through a wired coupling. Additionally, control circuit 220 can include a data store 250 that can store data from processing component 255, power component 275, transceiver 280, remote device 120, light sensor 230, or pupil sensor 235. Data store 250 can reside on any suitable type of storage device, non-limiting examples of which are illustrated with reference to FIGS. 10 and 11, and corresponding disclosure.

With continued reference to FIG. 4, processing component 255 includes pupil detection component 260 that detects current state and/or limits of an opening of pupil 145. Pupil detection component 260 can monitor continuously, or at random or predetermining intervals pupil sensor 235 to determine (or infer) an amount of opening of pupil 145.

Figure 5A:
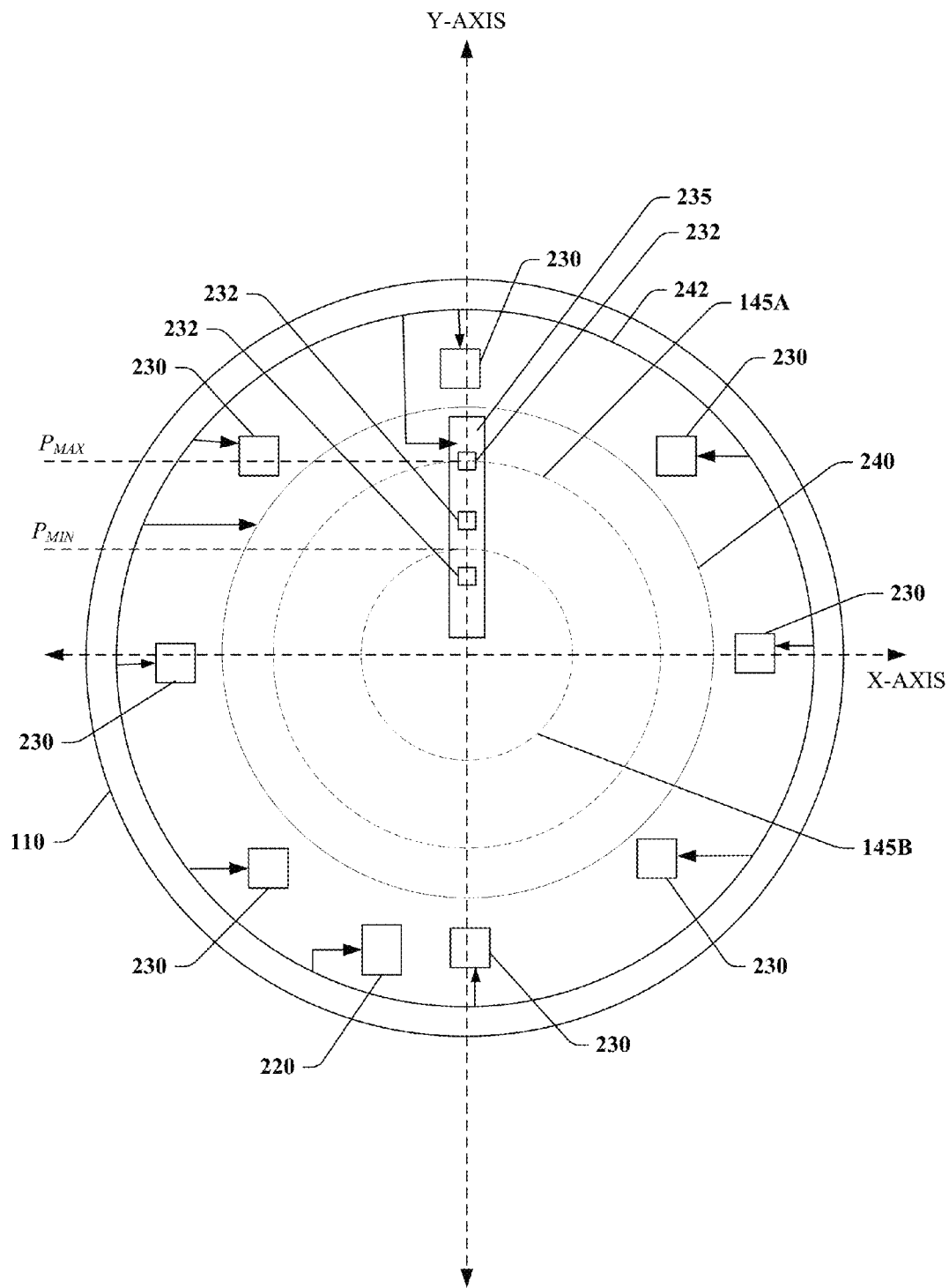
FIG. 5A illustrates a diagram of an exemplary non-limiting light restricting contact lens with a pupil sensor configured for detecting relative pupil opening sizes in accordance with an implementation of this disclosure.

Referring to FIG. 5A, in a non-limiting embodiment, pupil sensor 235 can be arranged on light restricting contact lens 110 in a suitable location to determine (or infer) current size P, maximum size $P_{MAX}$, or minimum size $P_{MIN}$ of an opening of pupil 145. For example, pupil sensor can include a plurality of sensors 232 facing eye 130 when light restricting contact lens 110 is worn. In an example, sensors 232 can be arranged in a linear array from near an outside edge of light restricting material 240 to near a geometric center of light restricting contact lens 110. Sensors 232 can be similar to light sensors 230 and can detect light reflected from an inside of eye 130 (e.g., photodiode). Additionally, sensors 232 can be in known locations (e.g., in a coordinate system) relative to each other and/or to a position (e.g. geometric center) on light restricting contact lens 110. In the arrangement depicted in FIG. 5A, pupil sensor 235 covers approximately a radius of light restricting area 240. As such, pupil sensor 235 can detect relative positions of an edge of an opening of pupil 145 as the pupil 145 dilates or constricts. It is to be appreciated that respective sensors 232 can be uniquely identifiable to control circuit 220, for example, via an identifier signal or identifying information conveyed from respective sensors 232 to control circuit 220. Any suitable number of sensors 232 in any suitable configuration for detecting an opening of a pupil 145 can be employed.

Figure 5B:
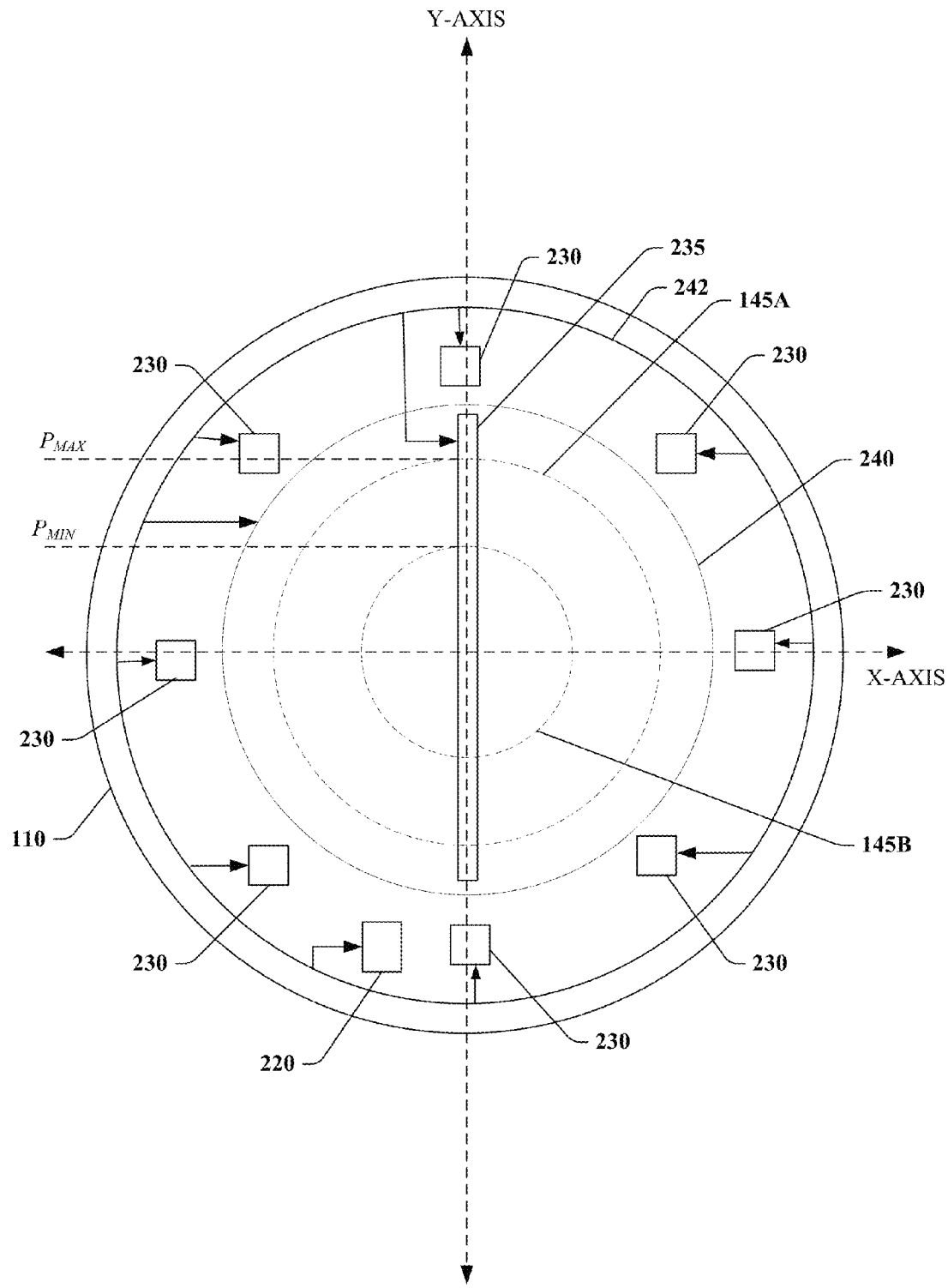
FIG. 5B illustrates a diagram of an exemplary non-limiting light restricting contact lens with a pupil sensor configured for detecting a full diameter of a pupil opening size in accordance with an implementation of this disclosure.

FIG. 5B illustrates an arrangement of pupil sensor 235 that has sensors 232 covering approximately a diameter of light restricting area 240. As such, pupil sensor 235 can detect a diameter of the opening of pupil 145 as it dilates and constricts.

Figure 5C:
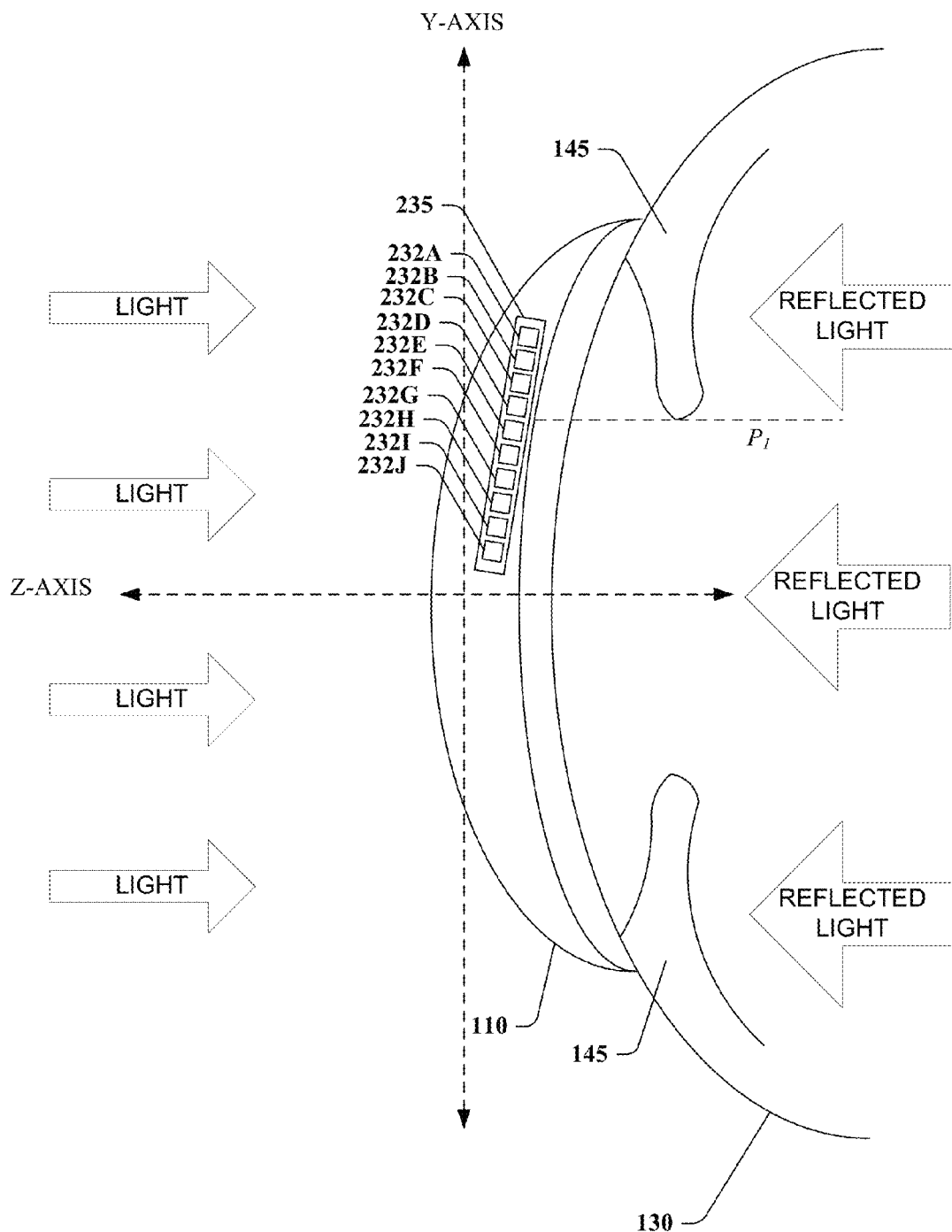
FIG. 5C illustrates a diagram of an exemplary non-limiting light restricting contact lens with a pupil sensor configured for detecting a first pupil opening size in accordance with an implementation of this disclosure.

FIG. 5C depicts a side view of light restricting contact lens 110 on eye 130. Control circuit 220, light sensors 230, pupil sensor 235, light restricting material 240, and coupling 240 exist but are not shown in FIGS. 5C-D to avoid cluttering depiction of configurations of pupil sensor 235. In an embodiment, z-axis can be aligned with a geometric center of light restricting contact lens 110. Furthermore, when light restricting contact lens 110 is worn, z-axis can be aligned with a central axis of an outward looking gaze of eye 130. In other words, z-axis can be aligned at a geometric center of pupil 145 and orthogonal to a two-dimensional plane corresponding to an image captured by eye 130. Pupil sensor 235 includes sensors 232A-J. Pupil detection component 260 can employ information from pupil sensor 235 to determine (or infer) current size P, maximum size $P_{MAX}$, or minimum size $P_{MIN}$ of an opening of pupil 145. For example, FIG. 5C depicts pupil 145 having an opening with size $P_1$. As such, light reflected from within eye 130 is blocked from reaching sensors 232A-D by pupil 145, but reaches sensors 232E-J. Pupil sensor 235 can provide indications (hereafter referred to as "pupil information") to pupil detection component 260 of state of respective sensors 232A-J with respect to light (e.g. intensity or wavelengths) detected by respective sensors 232A-J. Given known locations of sensors 232A-J, pupil detection component 260 can determine (or infer) $P_1$.

Figure 5D:
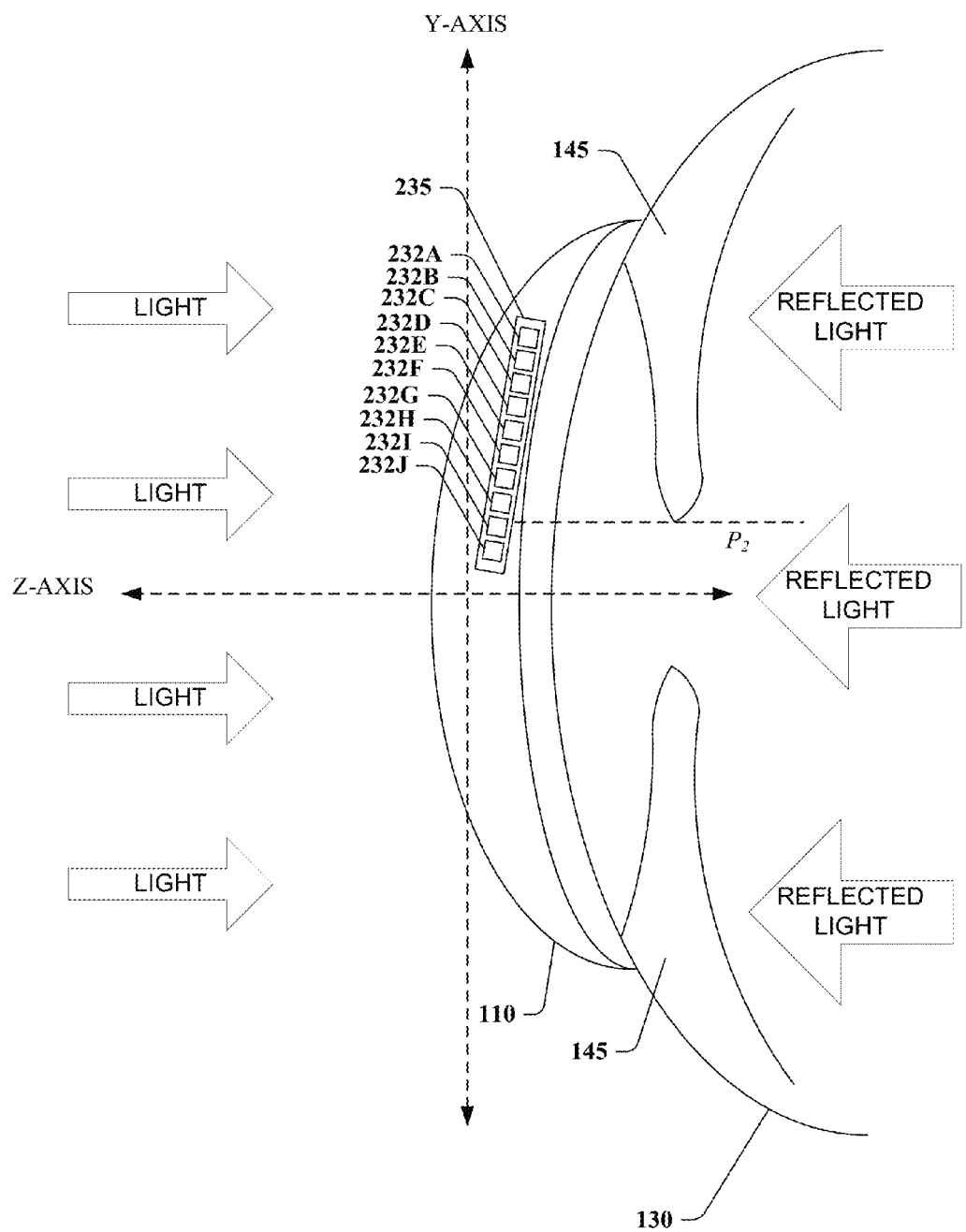
FIG. 5D illustrates a diagram of an exemplary non-limiting light restricting contact lens with a pupil sensor configured for detecting a second pupil opening size in accordance with an implementation of this disclosure.

FIG. 5D, depicts a side view of light restricting contact lens 110 on eye 130 as shown in FIG. 5C, but with the opening of pupil 145 dilated an amount $P_2$ less than $P_1$ in FIG. 5C. Thus, light reflected from within eye 130 is blocked from reaching sensors 232A-H by pupil 145, but reaches sensors 232I-J. Given known locations of sensors 232A-J, pupil detection component 260 can determine (or infer) $P_2$. By tracking P over time, pupil detection component 260 determine (or infer) $P_{MAX}$ or $P_{MIN}$.

Continuing with reference to FIG. 4, processing component 255 includes light control component 265 that configures amount of light restriction by light restricting material 240. For example, light control component 265 can selectively provide electronic signals to respective areas of light restricting material 240 to adjust respective restriction of some portion of light. Furthermore, light control component 265 can receive indications from respective light sensors 230 regarding light (e.g. intensity or wavelengths) detected by respective light sensors 230.

Figure 6A:
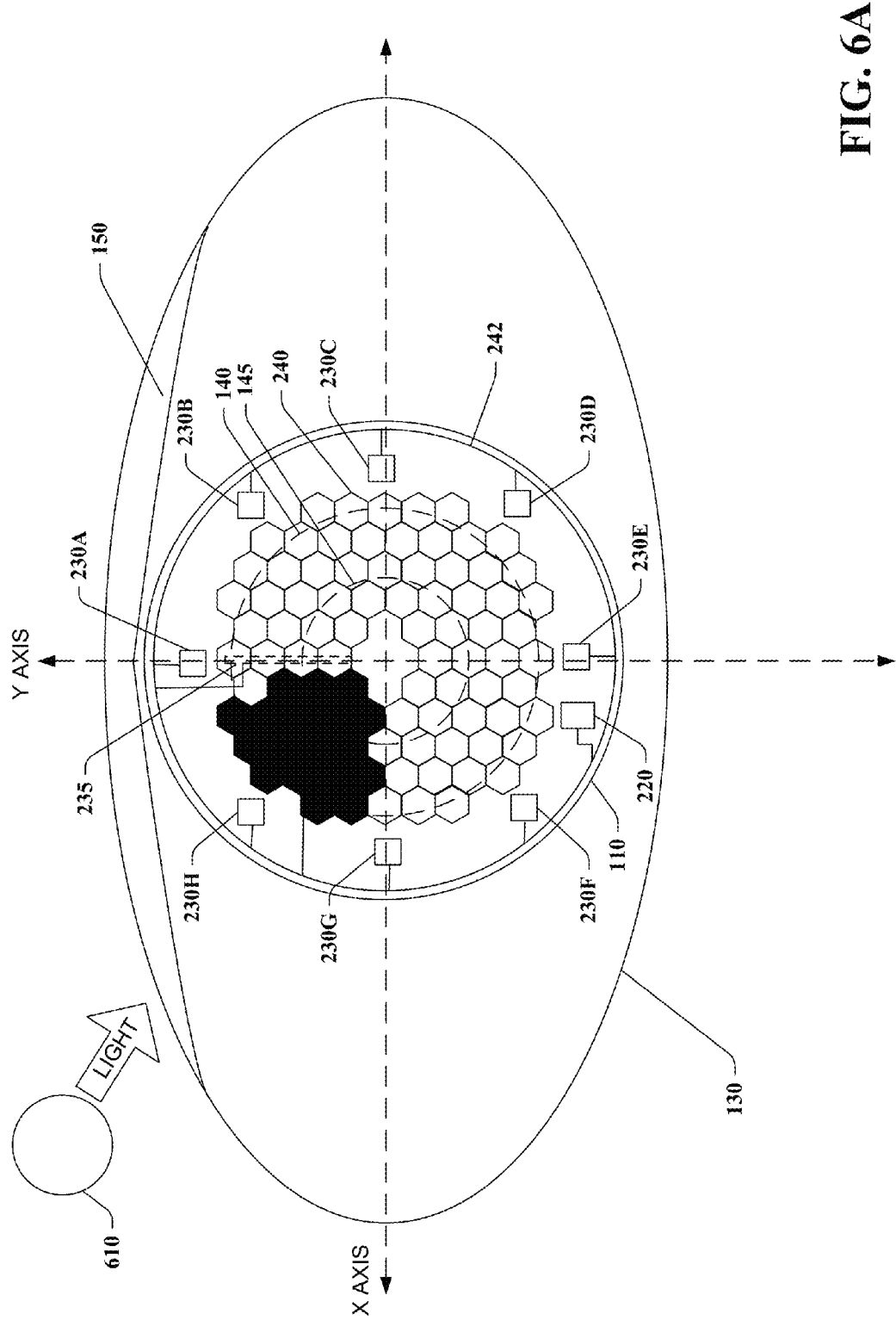
FIG. 6A illustrates a diagram of close-up view a non-limiting exemplary light restricting contact lens on eye with a light source in a first position and light restricting material adjusted according to the position of the light source in accordance with an implementation of this disclosure.

FIG. 6A illustrates a close-up view of a non-limiting exemplary light restricting contact lens 110 on eye 130 with light source 610. Light source 610 transmits light to eye 130 which is received at varying degrees by light sensors 230A-H. In this example, light sensor 230H receives light most directly while light sensors 230G and 230A respectively receive light to a lesser degree than light sensor 230H. Light sensors 230B-F receive light to a lesser degree than light sensors 230G and A. As such, light sensors 230A-H can provide indications (hereafter referred to as "incoming light information"), such as intensity, wavelengths, or direction, of light received at respective light sensors 230A-H to light control component 265. Light control component can determine (or infer) from the incoming light information respectively received from light sensors 230A-H where light source 610 is located relative to light restricting contact lens 110 as depicted in FIG. 6A. Light control component 265 can configure light restricting material 240 areas to restrict some portion of the light from light source 610. For example light restricting material 240 areas near light sensor 230H can have some portion of light restricted as depicted in FIG. 6A by the darkened colored hexagons while other light restricting material 240 areas away from light sensor 230H are not light restricted as illustrated by white hexagons.

It is to be appreciated that light control component 265 can also control light restricting material 240 based upon pupil information. For example, light control component 265 can initiate restricting portions of light through light restricting material 240 after pupil dilation has reached $P_{MIN}$, thereby acting as an extension of the pupil. In another embodiment, light control component 265 can activate restricting portions of light through light restricting material 240 at any size P, however selectively restricting light restricting material 240 areas that are within diameter of a current P in order to minimize excessive power usage by the light restricting material 240 areas outside of the diameter of the current P.

FIG. 6B depicts a close-up view of a non-limiting exemplary light restricting contact lens 110 on eye 130 with light source 610 in a different position than the illustration of FIG. 6A. Light control component 265 can employ incoming light information from sensors 232A-H to determine (or infer) that light source 610 is located relative to light restricting contact lens 110 as depicted in FIG. 6B. Additionally, light control component 265 can configure light restricting material 240 areas to restrict some portion of the light from light source 610 as depicted by the darkened hexagons near light sensors 230B-C based upon indications from light sensors 230A-H.

Figure 6C:
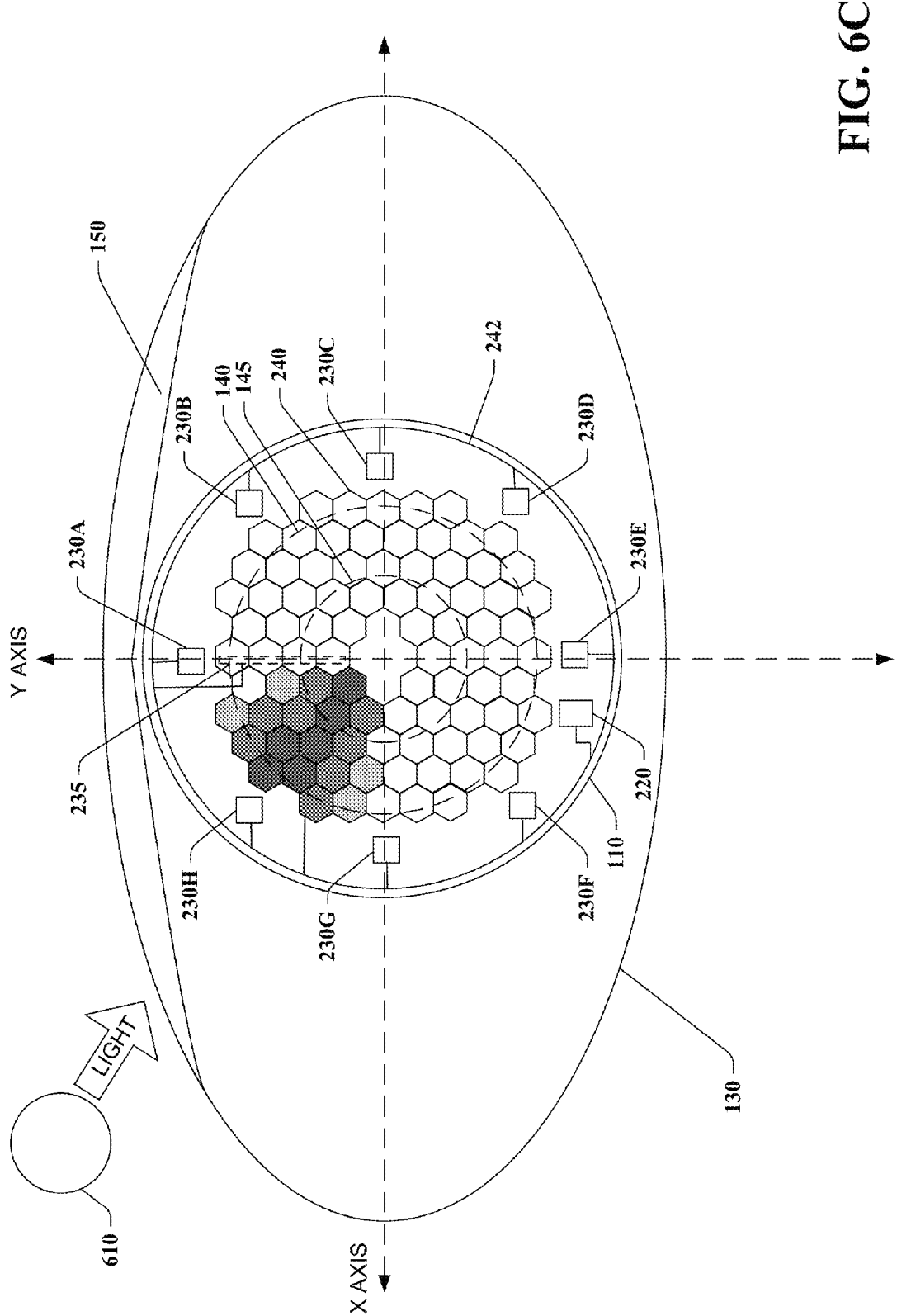
FIG. 6C illustrates a diagram of close-up view a non-limiting exemplary light restricting contact lens on eye with light source in the first position as in FIG. 6A and light restricting material adjusted to varying degrees of light restriction according to the position of the light source in accordance with an implementation of this disclosure.

FIG. 6C illustrates a close-up view of a non-limiting exemplary light restricting contact lens 110 on eye 130 with light source 610 similar to the depiction in FIG. 6A. However, light control component 265 can configure light restricting material 240 areas to restrict some portion of the light from light source 610 to varying degrees as depicted by the varying shades of gray of hexagons near light sensor 230H based upon incoming light information (e.g. light intensity) from light sensors 230A-H. For example, light restricting material 240 areas in a more direct line of reception of light from light source 610 can be configured to restrict more light than light restricting material 240 areas in a less direct line of reception of light from light source 610.

Figure 6D:
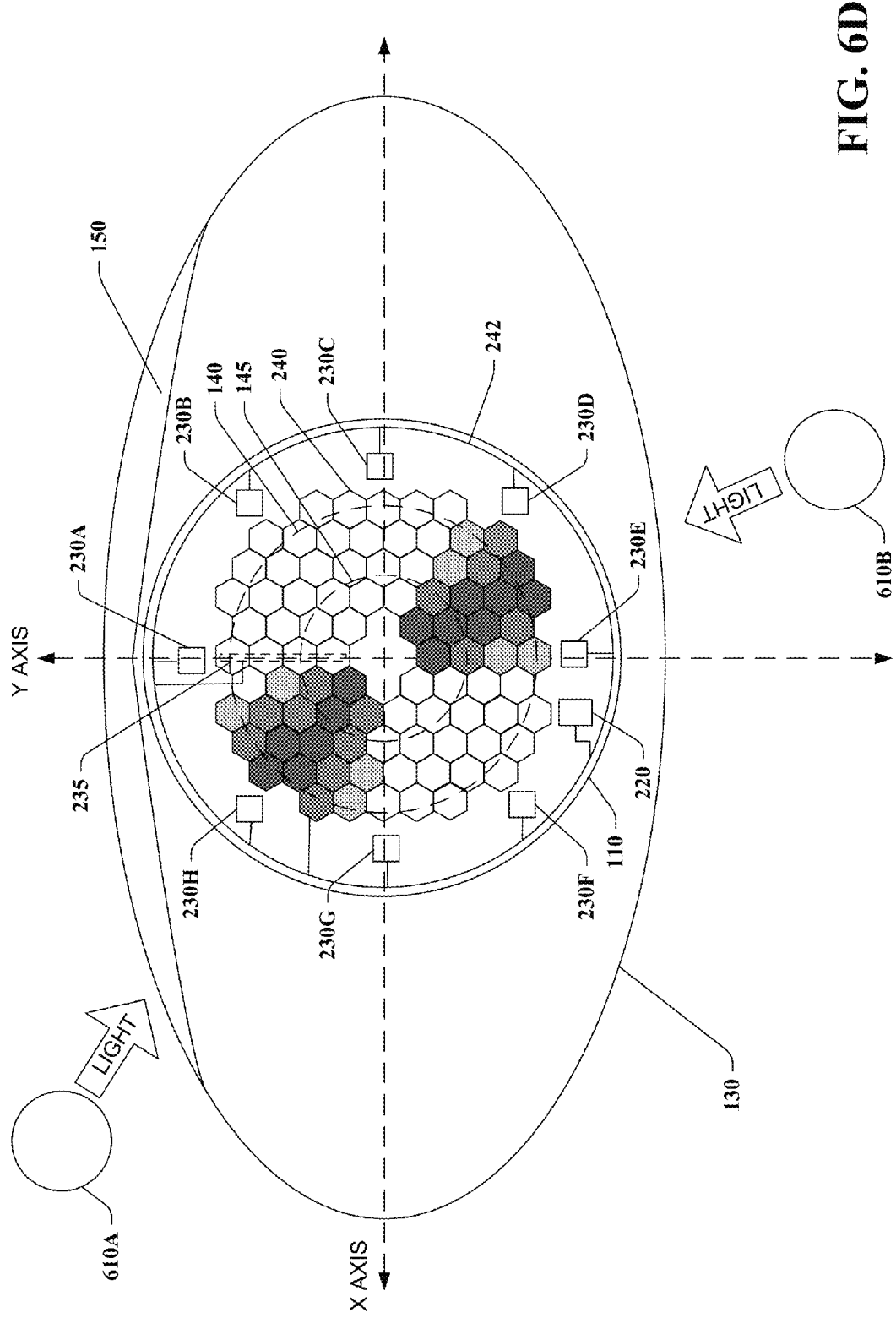
FIG. 6D illustrates a diagram of close-up view a non-limiting exemplary light restricting contact lens on eye with multiple light sources in differing positions and light restricting material adjusted according to the positions of the light sources in accordance with an implementation of this disclosure.

FIG. 6D shows a close-up view of a non-limiting exemplary light restricting contact lens 110 on eye 130, however with two light sources 610A-B. As such, light control component 265 can employ incoming light information from sensors 232A-H to determine (or infer) that light sources 610A-B are located relative to light restricting contact lens 110 as depicted in FIG. 6D. Light control component 265 can configure light restricting material 240 areas to restrict some portion of the light from light source 610 to varying degree as depicted by the varying shades of gray of hexagons near light sensors 230D, E, and H. It is to be appreciated that any number of light sources 610 and their respective directions can be determined (or inferred). Furthermore, light control component 265 can adjust light restricting material 240 areas, to restrict some portion of light to any suitable degree or pattern.

In an embodiment, control circuit 220 receives commands from remote device 120 instructing light control component 265 to configure light restricting material 240. For example, a wearer of light restricting contact lens 110 can issue a command via a mobile phone to activate light control component 265. In a further example, light restricting contact lens 110 does not have light sensors 230 while a remote device 120 (e.g, hat) worn by the wearer of light restricting contact lens 110 can have light sensors 230 to monitor intensity, wavelengths, and/or direction of light. Remote device 120 can provide information related to monitoring of light sensors 230 to light control component 265 in order to facilitate configuring light restricting material 240. In another embodiment, light restricting contact lens 110 can have a GPS sensor to determine GPS coordinates of light restricting contact lens 110. A remote device 120 (e.g., a camera) can provide GPS coordinates and/or timing of activation of a light source (e.g. flash) to light restricting contact lens 110 for control of light restricting material 240.

Referring back to FIG. 4, interface component 270 can communicate information, such as information related to or derived from light sensors 230, pupil sensor 235, or light restricting contact lens 110, to remote device 120 using one or more transceivers 280. Furthermore, interface component 270 can receive data or commands from remote device 120 using the one or more transceivers 280.

Power component 275 can include any suitable power source that can manage, receive, generate, store, and/or distribute necessary electrical power for the operation of various components of light restricting contact lens 110. For example, power component 275 can include but is not limited to a battery, a capacitor, a solar power source, radio frequency power source, electrochemical power source, temperature power source, or mechanically derived power source (e.g., MEMs system). In another example, power component 275 receives or generates power from one or more sensors suitable for capturing energy wirelessly or mechanically (e.g., a photodiode, a pressure sensor, a conductivity sensor, a temperature sensor, an electric field sensor, an antenna, or a micromechanical switch). Transceiver 280 can transmit and receive information to and from, or within light restricting contact lens 110. In some embodiments, transceiver 280 can include an RF antenna.

FIG. 7 depicts a non-limiting example of a pair of light restricting eyeglasses 115 for restricting some portion of light entering one or both eyes 130 of a wearer of eyeglasses 115. It is to be appreciated that components of eyeglasses 115 can operate similar to like components of light restricting contact lens 110. In an embodiment, pupil sensor 236 can provide information regarding size of an opening P similar to pupil sensor 235. However, recognizing that a pair of eyeglasses is further away from the surface of an eye 130 than light restricting contact lens 110, photodiodes may not be practical for pupil sensor 236. As such, pupil sensor 236 can employ one or more cameras facing eye 130 to monitor an opening of pupil 145.

It is to be appreciated that in accordance with one or more implementations described in this disclosure, users can opt-in or opt-out of providing personal information, demographic information, location information, proprietary information, sensitive information, or the like in connection with data gathering aspects. Moreover, one or more implementations described herein can provide for anonymizing collected, received, or transmitted data.

Figure 8:
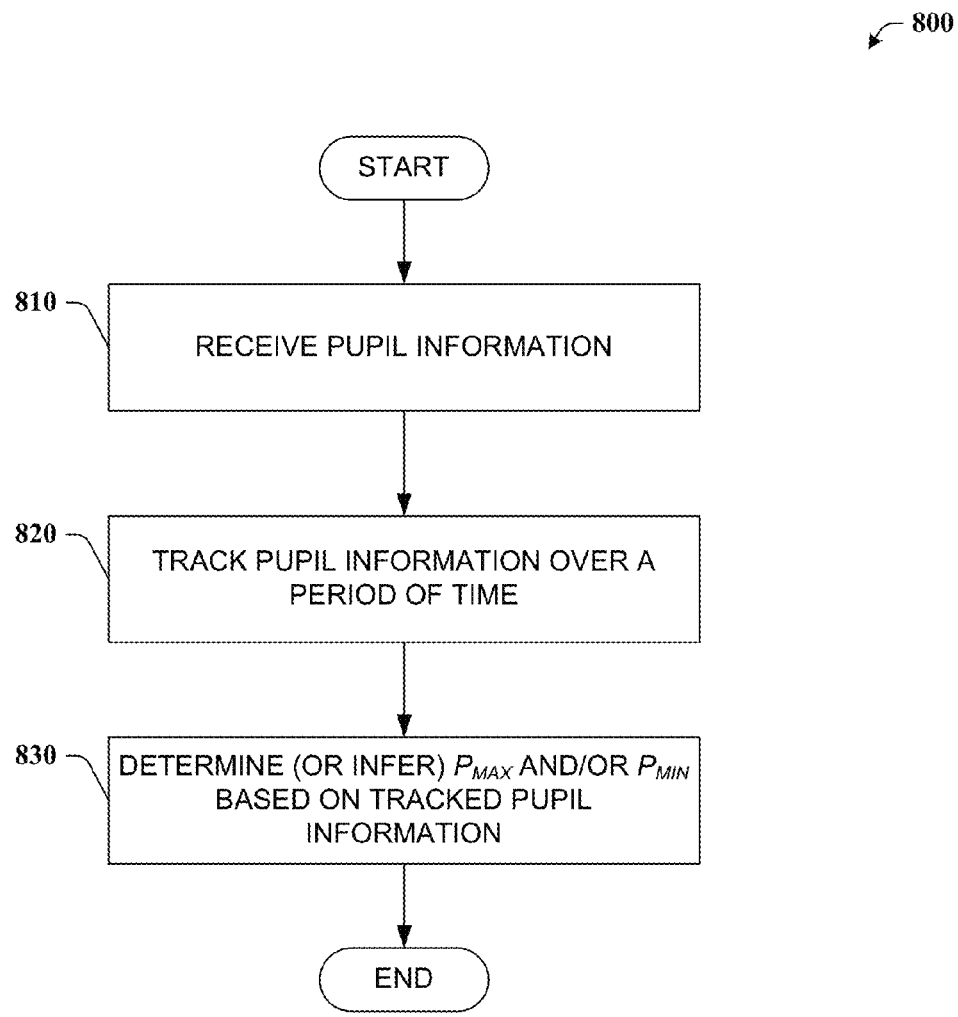
FIG. 8 illustrates an exemplary non-limiting flow diagram for learning maximum size or minimum size of an opening of a pupil in accordance with an implementation of this disclosure.
Figure 9:
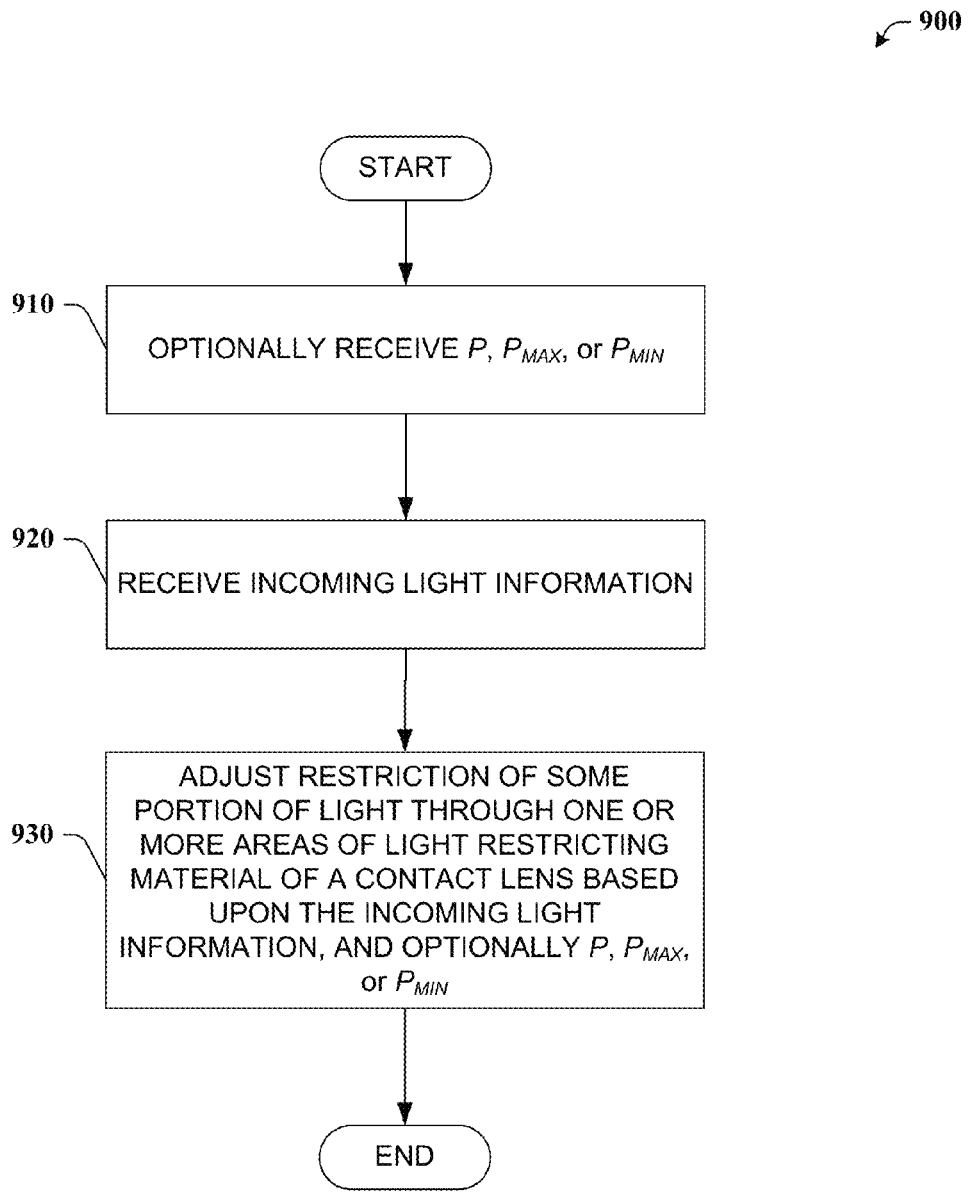
FIG. 9 illustrates an exemplary non-limiting flow diagram for restricting some portion of light through one or more areas of a contact lens in accordance with an implementation of this disclosure.

FIGS. 8 and 9 illustrates various methodologies in accordance with certain disclosed aspects. While, for purposes of simplicity of explanation, the methodologies are shown and described as a series of acts, it is to be understood and appreciated that the disclosed aspects are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with certain disclosed aspects. Additionally, it is to be further appreciated that the methodologies disclosed hereinafter and throughout this disclosure are capable of being stored on an article of manufacture to facilitate transporting and transferring such methodologies to computers.

Referring to FIG. 8, an exemplary method 800 for learning maximum size $P_{MAX}$, or minimum size $P_{MIN}$ of an opening of pupil 145 is depicted. At reference numeral 810, pupil information is received from a pupil sensor 235 (e.g. by a pupil detection component 260, processing component 255, or control circuit 220). At reference numeral 820, pupil information is tracked over a period of time (e.g. by a pupil detection component 260, processing component 255, or control circuit 220). At reference numeral 830, maximum size $P_{MAX}$, or minimum size $P_{MIN}$ of an opening of pupil 145 is determined (or inferred) based upon the tracked pupil information (e.g. by a pupil detection component 260, processing component 255, or control circuit 220).

Referring to FIG. 9, an exemplary method 900 for restricting some portion of light through one or more areas of a contact lens is depicted. At reference numeral 910, an optional act of receiving current size P, maximum size $P_{MAX}$, or minimum size $P_{MIN}$ of an opening of pupil 145 is performed (e.g. by a light control component 265, processing component 255, or control circuit 220). At reference numeral 920, incoming light information from one more light sensors 230 is received (e.g. by a light control component 265, processing component 255, interface component 270, or control circuit 220). At reference numeral 930, light restricting properties of one or more light restricting material 240 areas of a contact lens 110 are adjusted based upon the incoming light information and optionally current size P, maximum size $P_{MAX}$, or minimum size $P_{MIN}$ of an opening of pupil 145 (e.g. by a light control component 265, processing component 255, or control circuit 220).

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services can also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various embodiments of this disclosure.

Figure 10:
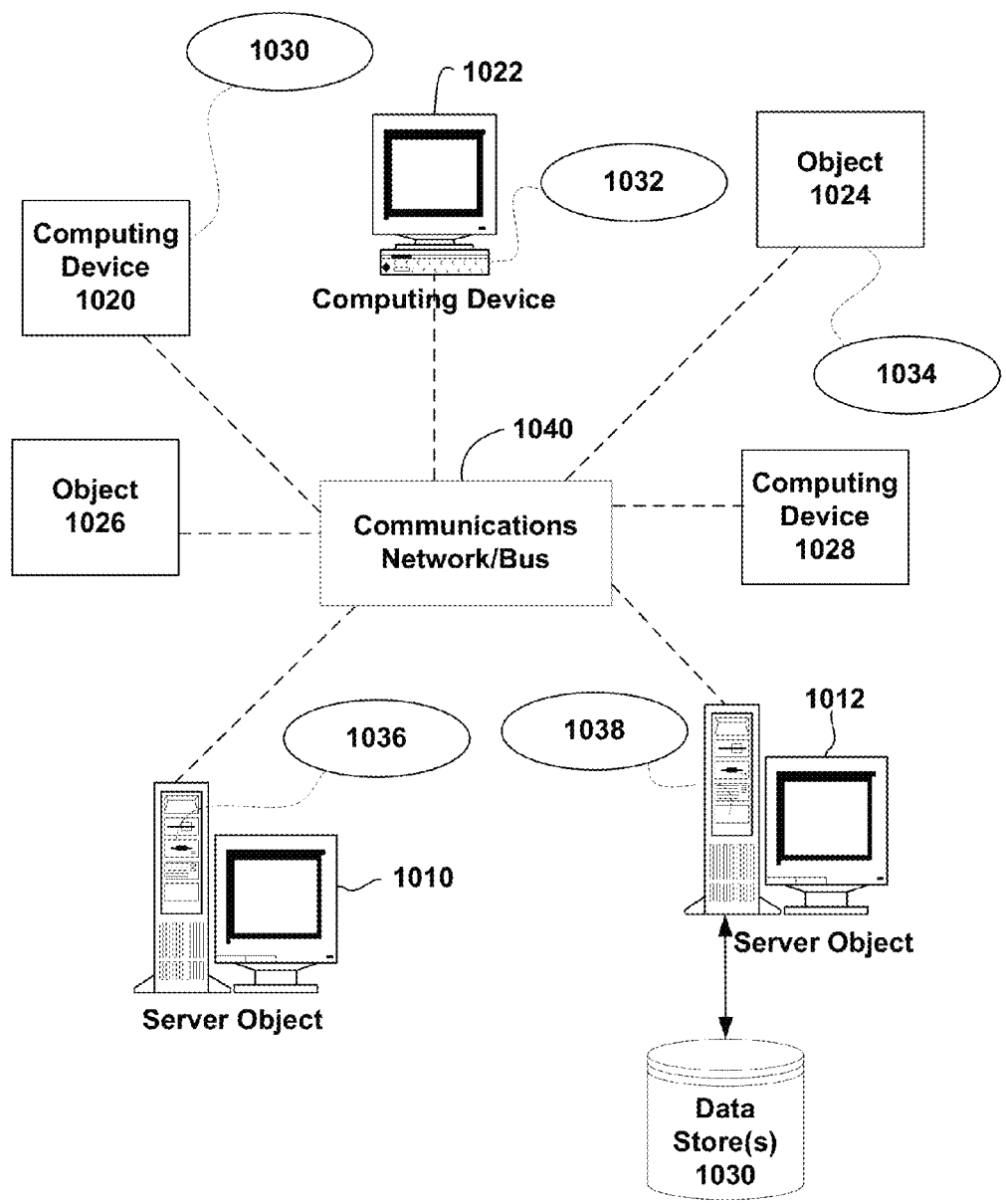
FIG. 10 is a block diagram representing an exemplary non-limiting networked environment in which the various embodiments can be implemented.

FIG. 10 provides a schematic diagram of an exemplary networked or distributed computing environment. The distributed computing environment comprises computing objects 1010, 1012, etc. and computing objects or devices 1020, 1022, 1024, 1026, 1028, etc., which may include programs, methods, data stores, programmable logic, etc., as represented by applications 1030, 1032, 1034, 1036, 1038. It can be appreciated that computing objects 1010, 1012, etc. and computing objects or devices 1020, 1022, 1024, 1026, 1028, etc. may comprise different devices, such as personal digital assistants (PDAs), audio/video devices, mobile phones, MP3 players, personal computers, laptops, tablets, etc.

Each computing object 1010, 1012, etc. and computing objects or devices 1020, 1022, 1024, 1026, 1028, etc. can communicate with one or more other computing objects 1010, 1012, etc. and computing objects or devices 1020, 1022, 1024, 1026, 1028, etc. by way of the communications network 1040, either directly or indirectly. Even though illustrated as a single element in FIG. 10, network 1040 may comprise other computing objects and computing devices that provide services to the system of FIG. 10, and/or may represent multiple interconnected networks, which are not shown. Each computing object 1010, 1012, etc. or computing objects or devices 1020, 1022, 1024, 1026, 1028, etc. can also contain an application, such as applications 1030, 1032, 1034, 1036, 1038, that might make use of an API, or other object, software, firmware and/or hardware, suitable for communication with or implementation of various embodiments of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any suitable network infrastructure can be used for exemplary communications made incident to the systems as described in various embodiments herein.

Thus, a host of network topologies and network infrastructures, such as client/server, peer-to-peer, or hybrid architectures, can be utilized. The "client" is a member of a class or group that uses the services of another class or group. A client can be a computer process, e.g., roughly a set of instructions or tasks, that requests a service provided by another program or process. A client process may utilize the requested service without having to "know" all working details about the other program or the service itself.

In a client/server architecture, particularly a networked system, a client can be a computer that accesses shared network resources provided by another computer, e.g., a server. In the illustration of FIG. 10, as a non-limiting example, computing objects or devices 1020, 1022, 1024, 1026, 1028, etc. can be thought of as clients and computing objects 1010, 1012, etc. can be thought of as servers where computing objects 1010, 1012, etc. provide data services, such as receiving data from client computing objects or devices 1020, 1022, 1024, 1026, 1028, etc., storing of data, processing of data, transmitting data to client computing objects or devices 1020, 1022, 1024, 1026, 1028, etc., although any computer can be considered a client, a server, or both, depending on the circumstances. Any of these computing devices may be processing data, or requesting transaction services or tasks that may implicate the techniques for systems as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network/bus 1040 is the Internet, for example, the computing objects 1010, 1012, etc. can be Web servers, file servers, media servers, etc. with which the client computing objects or devices 1020, 1022, 1024, 1026, 1028, etc. communicate via any of a number of known protocols, such as the hypertext transfer protocol (HTTP). Objects 1010, 1012, etc. may also serve as client computing objects or devices 1020, 1022, 1024, 1026, 1028, etc., as may be characteristic of a distributed computing environment.

Exemplary Computing Device

As mentioned, advantageously, the techniques described herein can be applied to any suitable device. It is to be understood, therefore, that handheld, portable and other computing devices and computing objects of all kinds are contemplated for use in connection with the various embodiments. Accordingly, the computer described below in FIG. 11 is but one example of a computing device that can be employed with implementing one or more of the systems or methods shown and described in connection with FIGS. 1-8. Additionally, a suitable server can include one or more aspects of the below computer, such as a media server or other media management server components.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 11 thus illustrates an example of a suitable computing system environment 1100 in which one or aspects of the embodiments described herein can be implemented, although as made clear above, the computing system environment 1100 is only one example of a suitable computing environment and is not intended to suggest any limitation as to scope of use or functionality. Neither is the computing environment 1100 be interpreted as having any dependency or requirement relating to any one or combination of components illustrated in the exemplary operating environment 1100.

With reference to FIG. 11, an exemplary computing device for implementing one or more embodiments in the form of a computer 1110 is depicted. Components of computer 1110 may include, but are not limited to, a processing unit 1120, a system memory 1130, and a system bus 1122 that couples various system components including the system memory to the processing unit 1120.

Computer 1110 typically includes a variety of computer readable media and can be any available media that can be accessed by computer 1110. The system memory 1130 may include computer storage media in the form of volatile and/or nonvolatile memory such as read only memory (ROM) and/or random access memory (RAM). By way of example, and not limitation, system memory 1130 may also include an operating system, application programs, other program modules, and program data.

A user can enter commands and information into the computer 1110 through input devices 1140, non-limiting examples of which can include a keyboard, keypad, a pointing device, a mouse, stylus, touchpad, touchscreen, trackball, motion detector, camera, microphone, joystick, game pad, scanner, or any other device that allows the user to interact with computer 1110. A monitor or other type of display device is also connected to the system bus 1122 via an interface, such as output interface 1150. In addition to a monitor, computers can also include other peripheral output devices such as speakers and a printer, which may be connected through output interface 1150.

The computer 1110 may operate in a networked or distributed environment using logical connections to one or more other remote computers, such as remote computer 1160. The remote computer 1160 may be a personal computer, a server, a router, a network PC, a peer device or other common network node, or any other remote media consumption or transmission device, and may include any or all of the elements described above relative to the computer 1110. The logical connections depicted in FIG. 11 include a network 1162, such local area network (LAN) or a wide area network (WAN), but may also include other networks/buses e.g., cellular networks.

As mentioned above, while exemplary embodiments have been described in connection with various computing devices and network architectures, the underlying concepts may be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the techniques described herein. Thus, embodiments herein are contemplated from the standpoint of an API (or other software object), as well as from a software or hardware object that implements one or more aspects described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the aspects disclosed herein are not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In order to provide for or aid in the numerous inferences described herein (e.g. inferring relationships between metadata or inferring topics of interest to users), components described herein can examine the entirety or a subset of the data to which it is granted access and can provide for reasoning about or infer states of the system, environment, etc. from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, x=(x1, x2, x3, x4, xn), to a confidence that the input belongs to a class, as by f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

In view of the exemplary systems described above, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A device, comprising:
a contact lens comprising:
 a substrate;
 one or more light restricting materials disposed on or within one or more areas of the substrate;
 one or more light sensors disposed on or within the substrate;
 a pupil detection component comprising an array of sensors on or within the substrate configured to determine a current state of dilation of a pupil;
 a control circuit disposed on the substrate and coupled with the one or more light restricting materials and one or more light sensors, the control circuit comprising:
  a light control component configured to:
   determine respective amount of light detected by the respective one or more light sensors; and
   adjust respective light blocking properties of the respective one or more light restricting materials based upon the respective amount of light.

2. The device of claim 1, wherein the one or more light restricting materials is a mechanical aperture having an opening; and wherein the light control component is further configured to adjust size of the opening based upon the respective amount of light.

3. The device of claim 1, wherein the one or more light restricting materials are electrochromic materials placed on or within a plurality of areas of the substrate; and wherein the light control component is configured to adjust the light blocking properties of electrochromic materials of a subset of the plurality of areas to restrict some portion of light based upon the respective amount of light.

4. The device of claim 1, wherein the one or more light sensors comprises a plurality of light sensors positioned in a ring near a periphery of the contact lens.

5. The device of claim 4, wherein the light control component is further configured to determine direction of a light source based upon the respective amount of light.

6. The device of claim 5, whereon the light control component is further configured to adjust the respective light blocking properties of the respective one or more light restricting materials based upon the direction of the light source.

7. The device of claim 1, wherein the array of sensors of the pupil detection component detect light reflected from within the eye.

8. The device of claim 7, whereon the light control component is further configured to adjust the respective light blocking properties of the respective one or more light restricting materials based upon the current state of dilation of the pupil.

9. The device of claim 1, wherein the control circuit further comprises an interface component configured to receive a command from a remote device instructing the light control component to adjust the respective light blocking properties of the respective one or more light restricting materials.

10. The device of claim 1, further comprising:
a power component disposed on the substrate configured to capture energy wirelessly or mechanically and convert the captured energy to usable electric power;
wherein at least one of the control circuit component, the one or more light restricting materials, or the one or more light sensors is configured to employ the usable electric power.

11. A method, comprising:
determining, by a device including a processing circuit, respective amounts of light detected by respective one or more light sensors disposed on or within a substrate of a contact lens;
determining, by the device, a state of dilation of a pupil using an array of pupil sensors disposed on or within the substrate of the contact lens; and
adjusting, by the device, respective light blocking properties of respective one or more light restricting materials disposed on or within one or more areas of the substrate based upon the respective amounts of light.

12. The method of claim 11, further comprising:
wherein the one or more light restricting materials is a mechanical aperture having an opening; and
adjusting, by the device, size of the opening based upon the respective amounts of light.

13. The method of claim 11, further comprising:
wherein the one or more light restricting materials are electrochromic materials placed on or within a plurality of areas of the substrate; and
adjusting, by the device, the light blocking properties of electrochromic materials of a subset of the plurality of areas to restrict some portion of light based upon the respective amounts of light.

14. The method of claim 11, wherein the one or more light sensors comprises a plurality of light sensors positioned in a ring near a periphery of the contact lens.

15. The method of claim 14, further comprising determining, by the device, a direction of a light source based upon the respective amounts of lights.

16. The method of claim 15, further comprising adjusting, by the device, the respective light blocking properties of the respective one or more light restricting materials based upon the direction of the light source.

17. The method of claim 11, further comprising determining, by the device, current state of dilation of a pupil by detecting light reflected from within the eye.

18. The method of claim 17, further comprising adjusting, by the device, the respective light blocking properties of the respective one or more light restricting materials based upon the current state of dilation of the pupil.

19. A non-transitory computer-readable medium having instructions stored thereon that, in response to execution, cause a device including a processing circuit to perform operations comprising:
   determining respective amounts of light detected by respective one or more light sensors disposed on or within a substrate of a contact lens;
   determining a state of dilation of a pupil using an array of pupil sensors disposed on or within the substrate of the contact lens; and
   adjusting respective light blocking properties of respective one or more light restricting materials disposed on or within one or more areas of the substrate based upon the respective amounts of light.

20. The non-transitory computer-readable medium of claim 19, further comprising:
   wherein the one or more light restricting materials is a mechanical aperture having an opening; and
   adjusting, by the contact lens, size of the opening based upon the respective amounts of light.

21. The non-transitory computer-readable medium of claim 19, further comprising:
   wherein the one or more light restricting materials are electrochromic materials placed on or within a plurality of areas of the substrate; and
   adjusting the light blocking properties of electrochromic materials of a subset of the plurality of areas to restrict some portion of light based upon the respective amounts of light.

22. The non-transitory computer-readable medium of claim 19, wherein the one or more light sensors comprises a plurality of light sensors positioned in a ring near a periphery of the contact lens.

23. The non-transitory computer-readable medium of claim 22, further comprising determining direction of a light source based upon the respective amounts of light.

24. The non-transitory computer-readable medium of claim 23, further comprising adjusting the respective light blocking properties of the respective one or more light restricting materials based upon the direction of the light source.

25. The non-transitory computer-readable medium of claim 19, further comprising determining current state of dilation of a pupil by detecting light reflected from within the eye.

26. The non-transitory computer-readable medium of claim 25, further comprising adjusting the respective light blocking properties of the respective one or more light restricting materials based upon the current state of dilation of the pupil.

* * * * *